United States Patent
Palmas et al.

(10) Patent No.: US 9,422,478 B2
(45) Date of Patent: Aug. 23, 2016

(54) CHAR-HANDLING PROCESSES IN A PYROLYSIS SYSTEM

(75) Inventors: Paolo Palmas, Des Plaines, IL (US); Paul A. Sechrist, Des Plaines, IL (US); Sid Kulprathipanja, Des Plaines, IL (US); Stanley J. Frey, Des Plaines, IL (US); Barry Freel, Ottawa (CA); Daniel N. Myers, Arlington Heights, IL (US); Vincenza Myers, legal representative, Arlington Heights, IL (US)

(73) Assignee: Ensyn Renewables, Inc., Wilmington, DE (US)

( * ) Notice: Subject to any disclaimer, the term of this patent is extended or adjusted under 35 U.S.C. 154(b) by 709 days.

(21) Appl. No.: 13/810,405

(22) PCT Filed: Jul. 8, 2011

(86) PCT No.: PCT/US2011/043295
§ 371 (c)(1),
(2), (4) Date: Aug. 29, 2013

(87) PCT Pub. No.: WO2012/009207
PCT Pub. Date: Jan. 19, 2012

(65) Prior Publication Data
US 2013/0327629 A1    Dec. 12, 2013

Related U.S. Application Data

(63) Continuation of application No. 12/837,376, filed on Jul. 15, 2010, now Pat. No. 8,499,702.

(51) Int. Cl.
*F23B 90/00* (2011.01)
*C10B 23/00* (2006.01)
(Continued)

(52) U.S. Cl.
CPC ............... *C10B 23/00* (2013.01); *C10B 49/22* (2013.01); *C10B 53/02* (2013.01); *C10C 5/00* (2013.01);
(Continued)

(58) Field of Classification Search
CPC ........ C10B 49/22; C10B 23/00; C10B 53/02; C10C 5/00; C10K 1/026; F23G 5/0273; F23G 5/30; F23G 5/46; F23G 5/50; F23G 7/10; F23G 2201/303; F23G 2201/304; F23G 2201/601; F23G 2206/10; F23G 2900/50205; Y02P 30/20; Y02P 20/145; Y02E 50/14
USPC ......................................................... 110/341
See application file for complete search history.

(56) References Cited

U.S. PATENT DOCUMENTS

| 1,252,072 A | 1/1918 | Abbot |
| 2,205,757 A | 6/1940 | Wheat |

(Continued)

FOREIGN PATENT DOCUMENTS

| BR | 8304158 | 7/1984 |
| BR | 8304794 | 4/1985 |

(Continued)

OTHER PUBLICATIONS

Graham, R.G. et al. "Thermal and Catalytic Fast Pyrolysis of Lignin by Rapid Thermal Processing (RPT)," Seventh Canadian Bioenergy R&D Seminar, Skyline Hotel, Ottawa, Ontario, Canada, Apr. 24-26, 1989.

(Continued)

*Primary Examiner* — Kenneth Rinehart
*Assistant Examiner* — Bao D Nguyen
(74) *Attorney, Agent, or Firm* — Jones Day

(57) ABSTRACT

Char-handling processes for controlling overall heat balance, ash accumulation, and afterburn in a reheater are provided. Carbonaceous biomass feedstock is pyrolyzed using a heat transfer medium forming pyrolysis products and a spent heat transfer medium. The spent heat transfer medium is separated into segregated char and char-depleted spent heat transfer medium. The char-depleted spent heat transfer medium is introduced into a dense bed of heat transfer medium fluidized by a stream of oxygen-containing regeneration gas. All or a portion of the segregated char is combusted in the dense bed using the stream of oxygen-containing regeneration gas. A portion of the segregated char may be exported out of the pyrolysis system to control the overall heat balance and ash accumulation.

17 Claims, 11 Drawing Sheets

(51) Int. Cl.

| | |
|---|---|
| *C10B 49/22* | (2006.01) |
| *C10B 53/02* | (2006.01) |
| *C10C 5/00* | (2006.01) |
| *C10K 1/02* | (2006.01) |
| *F23G 5/027* | (2006.01) |
| *F23G 5/30* | (2006.01) |
| *F23G 5/46* | (2006.01) |
| *F23G 5/50* | (2006.01) |
| *F23G 7/10* | (2006.01) |

(52) U.S. Cl.
CPC .............. *C10K 1/026* (2013.01); *F23G 5/0273* (2013.01); *F23G 5/30* (2013.01); *F23G 5/46* (2013.01); *F23G 5/50* (2013.01); *F23G 7/10* (2013.01); *F23G 2201/303* (2013.01); *F23G 2201/304* (2013.01); *F23G 2201/601* (2013.01); *F23G 2206/10* (2013.01); *F23G 2900/50205* (2013.01); *Y02E 50/14* (2013.01); *Y02P 20/145* (2015.11); *Y02P 30/20* (2015.11)

(56) References Cited

U.S. PATENT DOCUMENTS

| | | | |
|---|---|---|---|
| 2,318,555 A | 5/1943 | Ruthruff | |
| 2,326,525 A | 8/1943 | Diwoky | |
| 2,328,202 A | 8/1943 | Doerner | |
| 2,380,098 A | 7/1945 | Doerner | |
| 2,492,948 A | 1/1950 | Berger | |
| 2,566,353 A | 9/1951 | Mills | |
| 2,696,979 A | 12/1954 | Berge | |
| 2,884,303 A | 4/1959 | William | |
| 3,130,007 A | 4/1964 | Breck | |
| 3,309,356 A | 3/1967 | Esterer | |
| 3,313,726 A | 4/1967 | Campbell et al. | |
| 3,445,549 A | 5/1969 | Kristian | |
| 3,467,502 A | 9/1969 | Davis | |
| 3,694,346 A | 9/1972 | Blaser et al. | |
| 3,696,022 A | 10/1972 | Hutchings | |
| 3,760,870 A | 9/1973 | Guetlhuber | |
| 3,776,533 A | 12/1973 | Vlnaty | |
| 3,814,176 A | 6/1974 | Seth | |
| 3,853,498 A | 12/1974 | Bailie | |
| 3,876,533 A | 4/1975 | Myers | |
| 3,890,111 A | 6/1975 | Knudsen | |
| 3,907,661 A | 9/1975 | Gwyn et al. | |
| 3,925,024 A | 12/1975 | Hollingsworth et al. | |
| 3,927,996 A | 12/1975 | Knudsen et al. | |
| 3,959,420 A | 5/1976 | Geddes et al. | |
| 4,003,829 A | 1/1977 | Burger et al. | |
| 4,032,305 A | 6/1977 | Squires | |
| 4,039,290 A | 8/1977 | Inada et al. | |
| 4,052,265 A | 10/1977 | Kemp | |
| 4,064,018 A | 12/1977 | Choi | |
| 4,064,043 A | 12/1977 | Kollman | |
| 4,085,030 A | 4/1978 | Green et al. | |
| 4,101,414 A | 7/1978 | Kim et al. | |
| 4,102,773 A | 7/1978 | Green et al. | |
| 4,103,902 A | 8/1978 | Steiner et al. | |
| 4,138,020 A | 2/1979 | Steiner et al. | |
| 4,145,274 A | 3/1979 | Green et al. | |
| 4,153,514 A | 5/1979 | Garrett et al. | |
| 4,157,245 A | 6/1979 | Mitchell et al. | |
| 4,204,915 A | 5/1980 | Kurata et al. | |
| 4,219,537 A | 8/1980 | Steiner | |
| 4,225,415 A | 9/1980 | Mirza et al. | |
| 4,233,119 A | 11/1980 | Meyers et al. | |
| 4,245,693 A | 1/1981 | Cheng | |
| 4,272,402 A | 6/1981 | Mayes | |
| 4,284,616 A | 8/1981 | Solbakken et al. | |
| 4,298,453 A | 11/1981 | Schoennagel et al. | |
| 4,300,009 A | 11/1981 | Haag et al. | |
| 4,301,771 A | 11/1981 | Jukkola et al. | |
| 4,306,619 A | 12/1981 | Trojani | |
| 4,308,411 A | 12/1981 | Frankiewicz | |
| 4,311,670 A | 1/1982 | Nieminen et al. | |
| 4,317,703 A | 3/1982 | Bowen et al. | |
| 4,321,096 A | 3/1982 | Dobbin | |
| 4,324,637 A | 4/1982 | Durai-swamy | |
| 4,324,641 A | 4/1982 | Durai-Swamy | |
| 4,324,642 A | 4/1982 | Durai-swamy | |
| 4,324,644 A | 4/1982 | Durai-swamy | |
| 4,325,327 A | 4/1982 | Kantesaria et al. | |
| 4,334,893 A | 6/1982 | Lang | |
| 4,336,128 A | 6/1982 | Tamm | |
| 4,341,598 A | 7/1982 | Green | |
| 4,344,770 A | 8/1982 | Capener et al. | |
| 4,364,796 A | 12/1982 | Ishii et al. | |
| 4,373,994 A | 2/1983 | Lee | |
| 4,415,434 A | 11/1983 | Hargreaves et al. | |
| 4,422,927 A | 12/1983 | Kowalczyk et al. | |
| 4,434,726 A | 3/1984 | Jones | |
| 4,443,229 A | 4/1984 | Sageman et al. | |
| 4,456,504 A | 6/1984 | Spars et al. | |
| 4,482,451 A | 11/1984 | Kemp | |
| 4,495,056 A | 1/1985 | Venardos et al. | |
| 4,504,379 A | 3/1985 | Stuntz et al. | |
| 4,537,571 A | 8/1985 | Buxel et al. | |
| 4,548,615 A | 10/1985 | Lonchamp et al. | |
| 4,552,203 A | 11/1985 | Chrysostome et al. | |
| 4,574,743 A | 3/1986 | Claus | |
| 4,584,064 A | 4/1986 | Ciais et al. | |
| 4,584,947 A | 4/1986 | Chittick | |
| 4,595,567 A | 6/1986 | Hedrick | |
| 4,597,771 A * | 7/1986 | Cheng ........................ | C10J 3/56 266/160 |
| 4,615,870 A | 10/1986 | Armstrong et al. | |
| 4,617,693 A | 10/1986 | Meyers et al. | |
| 4,645,568 A | 2/1987 | Kurps et al. | |
| 4,668,243 A | 5/1987 | Schulz | |
| 4,678,860 A | 7/1987 | Kuester | |
| 4,684,375 A | 8/1987 | Morin et al. | |
| 4,710,357 A | 12/1987 | Cetinkaya et al. | |
| 4,714,109 A | 12/1987 | Tsao | |
| 4,732,091 A | 3/1988 | Gould | |
| 4,823,712 A * | 4/1989 | Wormer ..................... | C10J 3/54 110/245 |
| 4,828,581 A | 5/1989 | Feldmann et al. | |
| 4,849,091 A | 7/1989 | Cabrera et al. | |
| 4,880,473 A | 11/1989 | Scott et al. | |
| 4,881,592 A | 11/1989 | Cetinkaya | |
| 4,891,459 A | 1/1990 | Knight et al. | |
| 4,897,178 A | 1/1990 | Best et al. | |
| 4,931,171 A | 6/1990 | Piotter | |
| 4,940,007 A | 7/1990 | Hiltunen et al. | |
| 4,942,269 A | 7/1990 | Chum et al. | |
| 4,968,325 A | 11/1990 | Black et al. | |
| 4,983,278 A | 1/1991 | Cha et al. | |
| 4,987,178 A | 1/1991 | Shibata et al. | |
| 4,988,430 A | 1/1991 | Sechrist et al. | |
| 4,992,605 A | 2/1991 | Craig et al. | |
| 5,009,770 A | 4/1991 | Miller et al. | |
| 5,011,592 A | 4/1991 | Owen et al. | |
| 5,018,458 A | 5/1991 | McIntyre et al. | |
| 5,041,209 A | 8/1991 | Cha et al. | |
| 5,059,404 A | 10/1991 | Mansour et al. | |
| 5,077,252 A | 12/1991 | Owen et al. | |
| 5,093,085 A | 3/1992 | Engstrom et al. | |
| 5,136,117 A | 8/1992 | Paisley et al. | |
| 5,212,129 A | 5/1993 | Lomas | |
| 5,225,044 A | 7/1993 | Breu | |
| 5,236,688 A | 8/1993 | Watanabe et al. | |
| 5,239,946 A | 8/1993 | Garcia-mallol | |
| 5,243,922 A | 9/1993 | Rehmat et al. | |
| 5,281,727 A | 1/1994 | Carver et al. | |
| 5,306,481 A | 4/1994 | Mansour et al. | |
| 5,326,919 A | 7/1994 | Paisley et al. | |
| 5,343,939 A | 9/1994 | Cetinkaya | |
| 5,371,212 A | 12/1994 | Moens | |
| 5,376,340 A | 12/1994 | Bayer et al. | |
| 5,380,916 A | 1/1995 | Rao | |
| 5,395,455 A | 3/1995 | Scott et al. | |
| 5,402,548 A | 4/1995 | Adair et al. | |
| 5,407,674 A | 4/1995 | Gabetta et al. | |

(56) References Cited

U.S. PATENT DOCUMENTS

| | | |
|---|---|---|
| 5,423,891 A | 6/1995 | Taylor |
| 5,426,807 A | 6/1995 | Grimsley et al. |
| 5,478,736 A | 12/1995 | Nair |
| 5,494,653 A | 2/1996 | Paisley |
| 5,520,722 A | 5/1996 | Hershkowitz et al. |
| 5,536,488 A | 7/1996 | Mansour et al. |
| 5,578,092 A | 11/1996 | Collin |
| 5,584,985 A | 12/1996 | Lomas |
| 5,605,551 A | 2/1997 | Scott et al. |
| 5,637,192 A | 6/1997 | Mansour et al. |
| 5,654,448 A | 8/1997 | Pandey et al. |
| 5,662,050 A | 9/1997 | Angelo, II et al. |
| 5,703,299 A | 12/1997 | Carleton et al. |
| 5,713,977 A | 2/1998 | Kobayashi |
| 5,725,738 A | 3/1998 | Brioni et al. |
| 5,728,271 A | 3/1998 | Piskorz et al. |
| 5,744,333 A | 4/1998 | Cociancich et al. |
| 5,788,784 A | 8/1998 | Koppenhoefer et al. |
| 5,792,340 A | 8/1998 | Freel et al. |
| 5,853,548 A | 12/1998 | Piskorz et al. |
| 5,879,079 A | 3/1999 | Hohmann et al. |
| 5,879,642 A | 3/1999 | Trimble et al. |
| 5,879,650 A | 3/1999 | Kaul et al. |
| 5,904,838 A | 5/1999 | Kalnes et al. |
| 5,915,311 A | 6/1999 | Muller et al. |
| 5,961,786 A | 10/1999 | Freel et al. |
| 5,969,165 A | 10/1999 | Liu |
| 6,002,025 A | 12/1999 | Page et al. |
| 6,011,187 A | 1/2000 | Horizoe et al. |
| 6,033,555 A | 3/2000 | Chen et al. |
| 6,106,702 A | 8/2000 | Sohn et al. |
| 6,113,862 A | 9/2000 | Jorgensen et al. |
| 6,133,499 A | 10/2000 | Horizoe et al. |
| 6,149,765 A | 11/2000 | Mansour et al. |
| 6,190,542 B1 | 2/2001 | Comolli et al. |
| 6,193,837 B1 | 2/2001 | Agblevor et al. |
| 6,237,541 B1 | 5/2001 | Alliston et al. |
| 6,286,443 B1* | 9/2001 | Fujinami ............... F23G 5/027 110/208 |
| 6,339,182 B1 | 1/2002 | Munson et al. |
| 6,398,921 B1 | 6/2002 | Moraski |
| 6,452,024 B1 | 9/2002 | Bui-Khac et al. |
| 6,455,015 B1 | 9/2002 | Kilroy |
| 6,485,841 B1 | 11/2002 | Freel et al. |
| 6,497,199 B2 | 12/2002 | Yamada et al. |
| 6,547,957 B1 | 4/2003 | Sudhakar et al. |
| 6,555,649 B2 | 4/2003 | Giroux et al. |
| 6,656,342 B2 | 12/2003 | Smith et al. |
| 6,660,157 B2 | 12/2003 | Que et al. |
| 6,676,828 B1 | 1/2004 | Galiasso et al. |
| 6,680,137 B2 | 1/2004 | Paisley et al. |
| 6,743,746 B1 | 6/2004 | Prilutsky et al. |
| 6,759,562 B2 | 7/2004 | Gartside et al. |
| 6,776,607 B2 | 8/2004 | Nahas et al. |
| 6,808,390 B2 | 10/2004 | Fung |
| 6,814,940 B1 | 11/2004 | Hiltunen et al. |
| 6,844,420 B1 | 1/2005 | Freel et al. |
| 6,875,341 B1 | 4/2005 | Bunger et al. |
| 6,960,325 B2 | 11/2005 | Kao et al. |
| 6,962,676 B1 | 11/2005 | Hyppaenen |
| 6,988,453 B2 | 1/2006 | Cole et al. |
| 7,004,999 B2 | 2/2006 | Johnson et al. |
| 7,022,741 B2 | 4/2006 | Jiang et al. |
| 7,026,262 B1 | 4/2006 | Palmas et al. |
| 7,202,389 B1 | 4/2007 | Brem |
| 7,214,252 B1 | 5/2007 | Krumm et al. |
| 7,226,954 B2 | 6/2007 | Tavasoli et al. |
| 7,240,639 B2 | 7/2007 | Hyppanen et al. |
| 7,247,233 B1 | 7/2007 | Hedrick et al. |
| 7,262,331 B2 | 8/2007 | van de Beld et al. |
| 7,263,934 B2 | 9/2007 | Copeland et al. |
| 7,285,186 B2 | 10/2007 | Tokarz |
| 7,319,168 B2 | 1/2008 | Sanada |
| 7,473,349 B2 | 1/2009 | Keckler et al. |
| 7,476,774 B2 | 1/2009 | Umansky et al. |
| 7,479,217 B2 | 1/2009 | Pinault et al. |
| 7,491,317 B2 | 2/2009 | Meier et al. |
| 7,563,345 B2 | 7/2009 | Tokarz |
| 7,572,362 B2 | 8/2009 | Freel et al. |
| 7,572,365 B2 | 8/2009 | Freel et al. |
| 7,578,927 B2 | 8/2009 | Marker et al. |
| 7,625,432 B2 | 12/2009 | Gouman et al. |
| 7,811,340 B2 | 10/2010 | Bayle et al. |
| 7,897,124 B2 | 3/2011 | Gunnerman et al. |
| 7,905,990 B2 | 3/2011 | Freel |
| 7,943,014 B2 | 5/2011 | Berruti et al. |
| 7,956,224 B2 | 6/2011 | Elliott et al. |
| 7,960,598 B2 | 6/2011 | Spilker et al. |
| 7,982,075 B2 | 7/2011 | Marker et al. |
| 7,998,315 B2 | 8/2011 | Bridgwater et al. |
| 7,998,455 B2 | 8/2011 | Abbas et al. |
| 7,999,142 B2 | 8/2011 | Kalnes et al. |
| 7,999,143 B2 | 8/2011 | Marker et al. |
| 8,043,391 B2 | 10/2011 | Dinjus et al. |
| 8,057,641 B2 | 11/2011 | Bartek et al. |
| 8,097,090 B2 | 1/2012 | Freel et al. |
| 8,097,216 B2 | 1/2012 | Beech et al. |
| 8,147,766 B2 | 4/2012 | Spilker et al. |
| 8,153,850 B2 | 4/2012 | Hall et al. |
| 8,202,332 B2 | 6/2012 | Agblevor |
| 8,207,385 B2 | 6/2012 | O'Connor et al. |
| 8,217,211 B2 | 7/2012 | Agrawal et al. |
| 8,277,643 B2 | 10/2012 | Huber et al. |
| 8,288,600 B2 | 10/2012 | Bartek et al. |
| 8,304,592 B2 | 11/2012 | Luebke |
| 8,314,275 B2 | 11/2012 | Brandvold |
| 8,329,967 B2 | 12/2012 | Brandvold et al. |
| 8,404,910 B2 | 3/2013 | Kocal et al. |
| 8,499,702 B2 | 8/2013 | Palmas et al. |
| 8,519,203 B2 | 8/2013 | Marinangeli et al. |
| 8,519,205 B2 | 8/2013 | Frey et al. |
| 8,524,087 B2 | 9/2013 | Frey et al. |
| 8,575,408 B2 | 11/2013 | Marker et al. |
| 8,715,490 B2 | 5/2014 | Brandvold et al. |
| 8,726,443 B2 | 5/2014 | Freel et al. |
| 9,044,727 B2 | 6/2015 | Kulprathipanja et al. |
| 2002/0014033 A1 | 2/2002 | Langer et al. |
| 2002/0100711 A1 | 8/2002 | Freel et al. |
| 2002/0146358 A1 | 10/2002 | Smith et al. |
| 2003/0049854 A1 | 3/2003 | Rhodes |
| 2003/0202912 A1 | 10/2003 | Myohanen et al. |
| 2004/0069682 A1 | 4/2004 | Freel et al. |
| 2004/0182003 A1 | 9/2004 | Bayle et al. |
| 2004/0200204 A1 | 10/2004 | Dries et al. |
| 2005/0167337 A1 | 8/2005 | Bunger et al. |
| 2005/0209328 A1 | 9/2005 | Allgood et al. |
| 2006/0010714 A1 | 1/2006 | Carin et al. |
| 2006/0016723 A1 | 1/2006 | Tang et al. |
| 2006/0070362 A1 | 4/2006 | Dewitz et al. |
| 2006/0074254 A1 | 4/2006 | Zhang et al. |
| 2006/0101665 A1 | 5/2006 | Carin et al. |
| 2006/0130719 A1* | 6/2006 | Morin ............... F23C 10/002 110/348 |
| 2006/0163053 A1 | 7/2006 | Ershag |
| 2006/0180060 A1 | 8/2006 | Crafton et al. |
| 2006/0185245 A1 | 8/2006 | Serio et al. |
| 2006/0201024 A1 | 9/2006 | Carin et al. |
| 2006/0254081 A1 | 11/2006 | Carin et al. |
| 2006/0264684 A1 | 11/2006 | Petri et al. |
| 2007/0000809 A1 | 1/2007 | Lin et al. |
| 2007/0010588 A1 | 1/2007 | Pearson |
| 2007/0141222 A1 | 6/2007 | Binder et al. |
| 2007/0205139 A1 | 9/2007 | Kulprathipanja et al. |
| 2007/0272538 A1 | 11/2007 | Satchell |
| 2008/0006519 A1 | 1/2008 | Badger |
| 2008/0006520 A1 | 1/2008 | Badger |
| 2008/0029437 A1 | 2/2008 | Umansky et al. |
| 2008/0035526 A1 | 2/2008 | Hedrick et al. |
| 2008/0035528 A1 | 2/2008 | Marker |
| 2008/0050792 A1 | 2/2008 | Zmierczak et al. |
| 2008/0051619 A1 | 2/2008 | Kulprathipanja et al. |
| 2008/0081006 A1 | 4/2008 | Myers et al. |
| 2008/0086937 A1 | 4/2008 | Hazlebeck et al. |
| 2008/0161615 A1 | 7/2008 | Chapus et al. |

(56) References Cited

U.S. PATENT DOCUMENTS

| | | |
|---|---|---|
| 2008/0171649 A1 | 7/2008 | Jan et al. |
| 2008/0185112 A1 | 8/2008 | Argyropoulos |
| 2008/0189979 A1 | 8/2008 | Carin et al. |
| 2008/0193345 A1 | 8/2008 | Lott et al. |
| 2008/0194896 A1 | 8/2008 | Brown et al. |
| 2008/0199821 A1 | 8/2008 | Nyberg et al. |
| 2008/0230440 A1 | 9/2008 | Graham et al. |
| 2008/0236043 A1 | 10/2008 | Dinjus et al. |
| 2008/0264771 A1 | 10/2008 | Dam-Johansen et al. |
| 2008/0274017 A1 | 11/2008 | Boykin et al. |
| 2008/0274022 A1 | 11/2008 | Boykin et al. |
| 2008/0282606 A1 | 11/2008 | Plaza et al. |
| 2008/0312476 A1 | 12/2008 | McCall |
| 2008/0318763 A1 | 12/2008 | Anderson |
| 2009/0008292 A1 | 1/2009 | Keusenkothen et al. |
| 2009/0008296 A1 | 1/2009 | Sappok et al. |
| 2009/0077867 A1 | 3/2009 | Marker et al. |
| 2009/0077868 A1 | 3/2009 | Brady et al. |
| 2009/0078557 A1 | 3/2009 | Tokarz |
| 2009/0078611 A1 | 3/2009 | Marker et al. |
| 2009/0082603 A1 | 3/2009 | Kalnes et al. |
| 2009/0082604 A1 | 3/2009 | Agrawal et al. |
| 2009/0084666 A1 | 4/2009 | Agrawal et al. |
| 2009/0090046 A1 | 4/2009 | O'Connor et al. |
| 2009/0090058 A1 | 4/2009 | Dam-Johansen et al. |
| 2009/0113787 A1 | 5/2009 | Elliott et al. |
| 2009/0139851 A1 | 6/2009 | Freel |
| 2009/0165378 A1 | 7/2009 | Agblevor |
| 2009/0183424 A1 | 7/2009 | Gorbell et al. |
| 2009/0188158 A1 | 7/2009 | Morgan |
| 2009/0193709 A1 | 8/2009 | Marker et al. |
| 2009/0208402 A1 | 8/2009 | Rossi |
| 2009/0227823 A1 | 9/2009 | Huber et al. |
| 2009/0242377 A1 | 10/2009 | Honkola et al. |
| 2009/0250376 A1 | 10/2009 | Brandvold et al. |
| 2009/0253947 A1 | 10/2009 | Brandvold et al. |
| 2009/0253948 A1 | 10/2009 | McCall et al. |
| 2009/0255144 A1 | 10/2009 | Gorbell et al. |
| 2009/0259076 A1 | 10/2009 | Simmons et al. |
| 2009/0259082 A1 | 10/2009 | Deluga et al. |
| 2009/0274600 A1 | 11/2009 | Jain et al. |
| 2009/0283442 A1 | 11/2009 | McCall et al. |
| 2009/0287029 A1 | 11/2009 | Anumakonda et al. |
| 2009/0293344 A1 | 12/2009 | O'Brien et al. |
| 2009/0293359 A1 | 12/2009 | Simmons et al. |
| 2009/0294324 A1 | 12/2009 | Brandvold et al. |
| 2009/0301930 A1 | 12/2009 | Brandvold et al. |
| 2009/0308787 A1 | 12/2009 | O'Connor et al. |
| 2009/0318737 A1 | 12/2009 | Luebke |
| 2009/0321311 A1 | 12/2009 | Marker et al. |
| 2010/0043634 A1 | 2/2010 | Shulfer et al. |
| 2010/0083566 A1 | 4/2010 | Fredriksen et al. |
| 2010/0133144 A1 | 6/2010 | Kokayeff et al. |
| 2010/0147743 A1 | 6/2010 | MacArthur et al. |
| 2010/0148122 A1 | 6/2010 | Breton et al. |
| 2010/0151550 A1 | 6/2010 | Nunez et al. |
| 2010/0158767 A1 | 6/2010 | Mehlberg et al. |
| 2010/0162625 A1 | 7/2010 | Mills |
| 2010/0163395 A1 | 7/2010 | Henrich et al. |
| 2010/0222620 A1 | 9/2010 | O'Connor et al. |
| 2010/0266464 A1 | 10/2010 | Sipila et al. |
| 2010/0325954 A1 | 12/2010 | Tiwari et al. |
| 2011/0017443 A1 | 1/2011 | Collins |
| 2011/0067438 A1 | 3/2011 | Bernasconi |
| 2011/0068585 A1 | 3/2011 | Dube et al. |
| 2011/0113675 A1 | 5/2011 | Fujiyama et al. |
| 2011/0123407 A1 | 5/2011 | Freel |
| 2011/0132737 A1 | 6/2011 | Jadhav |
| 2011/0139597 A1 | 6/2011 | Lin |
| 2011/0146135 A1 | 6/2011 | Brandvold |
| 2011/0146140 A1 | 6/2011 | Brandvold et al. |
| 2011/0146141 A1 | 6/2011 | Frey et al. |
| 2011/0146145 A1 | 6/2011 | Brandvold et al. |
| 2011/0160505 A1 | 6/2011 | McCall |
| 2011/0182778 A1 | 7/2011 | Breton et al. |
| 2011/0201854 A1 | 8/2011 | Kocal et al. |
| 2011/0224471 A1 | 9/2011 | Wormsbecher et al. |
| 2011/0239530 A1 | 10/2011 | Marinangeli et al. |
| 2011/0253600 A1 | 10/2011 | Niccum |
| 2011/0258914 A1 | 10/2011 | Banasiak et al. |
| 2011/0284359 A1 | 11/2011 | Sechrist et al. |
| 2012/0012039 A1 | 1/2012 | Palmas et al. |
| 2012/0017493 A1 | 1/2012 | Traynor et al. |
| 2012/0022171 A1 | 1/2012 | Frey |
| 2012/0023809 A1 | 2/2012 | Koch et al. |
| 2012/0047794 A1 | 3/2012 | Bartek et al. |
| 2012/0137939 A1 | 6/2012 | Kulprathipanja |
| 2012/0160741 A1 | 6/2012 | Gong et al. |
| 2012/0167454 A1 | 7/2012 | Brandvold et al. |
| 2012/0172622 A1 | 7/2012 | Kocal |
| 2012/0205289 A1 | 8/2012 | Joshi |
| 2012/0214114 A1 | 8/2012 | Kim et al. |
| 2012/0216448 A1 | 8/2012 | Ramirez Coredores et al. |
| 2012/0279825 A1 | 11/2012 | Freel et al. |
| 2012/0317871 A1 | 12/2012 | Frey et al. |
| 2013/0029168 A1 | 1/2013 | Trewella et al. |
| 2013/0062184 A1 | 3/2013 | Kulprathipanja et al. |
| 2013/0067803 A1 | 3/2013 | Kalakkunnath et al. |
| 2013/0075072 A1 | 3/2013 | Kulprathipanja et al. |
| 2013/0078581 A1 | 3/2013 | Kulprathipanja et al. |
| 2013/0105356 A1 | 5/2013 | Dijs et al. |
| 2013/0109765 A1 | 5/2013 | Jiang et al. |
| 2013/0118059 A1 | 5/2013 | Lange et al. |
| 2013/0150637 A1 | 6/2013 | Borremans et al. |
| 2013/0152453 A1 | 6/2013 | Baird et al. |
| 2013/0152454 A1 | 6/2013 | Baird et al. |
| 2013/0152455 A1 | 6/2013 | Baird et al. |
| 2013/0195727 A1 | 8/2013 | Bull et al. |
| 2013/0212930 A1 | 8/2013 | Naae et al. |
| 2013/0267743 A1 | 10/2013 | Brandvold et al. |
| 2014/0001026 A1 | 1/2014 | Baird et al. |
| 2014/0140895 A1 | 5/2014 | Davydov et al. |
| 2014/0142362 A1 | 5/2014 | Davydov et al. |

FOREIGN PATENT DOCUMENTS

| | | |
|---|---|---|
| CA | 1312497 | 1/1993 |
| CA | 2091373 | 9/1997 |
| CA | 2299049 | 12/2000 |
| CA | 2299149 | 12/2000 |
| CA | 2521829 | 3/2006 |
| CN | 1377938 | 11/2002 |
| CN | 1730177 | 2/2006 |
| CN | 101045524 | 10/2007 |
| CN | 101238197 | 8/2008 |
| CN | 101294085 | 10/2008 |
| CN | 101318622 | 12/2008 |
| CN | 101353582 | 1/2009 |
| CN | 101365770 | 2/2009 |
| CN | 101381611 | 3/2009 |
| CN | 101544901 | 9/2009 |
| CN | 101550347 | 10/2009 |
| CN | 101745349 | 6/2010 |
| CN | 101993712 | 3/2011 |
| EP | 105980 | 1/1986 |
| EP | 0578503 | 12/1994 |
| EP | 6760203 | 7/1998 |
| EP | 718392 | 9/1999 |
| EP | 787946 | 6/2000 |
| EP | 1420058 | 5/2004 |
| EP | 2325281 | 5/2011 |
| FI | 117512 | 11/2005 |
| GB | 1019133 | 2/1966 |
| GB | 1300966 | 12/1972 |
| JP | 58150793 | 9/1983 |
| JP | 1277196 | 11/1989 |
| JP | 11148625 | 6/1999 |
| JP | 2001/131560 | 5/2001 |
| JP | 2007/229548 | 9/2007 |
| SE | 9903742-6 | 1/2004 |
| WO | 81/01713 | 6/1981 |
| WO | 91/11499 | 8/1991 |
| WO | 92/07842 | 5/1992 |
| WO | 92/18492 | 10/1992 |

(56) References Cited

FOREIGN PATENT DOCUMENTS

| | | |
|---|---|---|
| WO | 94/13827 | 6/1994 |
| WO | 97/44410 | 11/1997 |
| WO | 01/09243 | 2/2001 |
| WO | 01/83645 | 11/2001 |
| WO | 02/49735 | 6/2002 |
| WO | 2006/071109 | 7/2006 |
| WO | 2007/017005 | 2/2007 |
| WO | 2007/045093 | 4/2007 |
| WO | 2007/050030 | 5/2007 |
| WO | 2007/112570 | 10/2007 |
| WO | 2007/128798 | 11/2007 |
| WO | 2008/009643 | 1/2008 |
| WO | 2008/020167 | 2/2008 |
| WO | 2008/092557 | 8/2008 |
| WO | 2009/019520 | 2/2009 |
| WO | 2009/047387 | 4/2009 |
| WO | 2009/047392 | 4/2009 |
| WO | 2009/067350 | 5/2009 |
| WO | 2009/099684 | 8/2009 |
| WO | 2009/118357 | 10/2009 |
| WO | 2009/118363 | 10/2009 |
| WO | 2009/126508 | 10/2009 |
| WO | 2009/131757 | 10/2009 |
| WO | 2010/002792 | 1/2010 |
| WO | 2011/146262 | 11/2011 |
| WO | 2012/009207 | 1/2012 |
| WO | 2012/012260 | 1/2012 |
| WO | 2012/062924 | 5/2012 |
| WO | 2012/078422 | 6/2012 |
| WO | 2012/088546 | 6/2012 |
| WO | 2012/115754 | 8/2012 |
| WO | 2013/043485 | 3/2013 |
| WO | 2013/090229 | 6/2013 |
| WO | 2014/031965 | 2/2014 |
| WO | 2014/210150 | 12/2014 |

OTHER PUBLICATIONS

Wisner, R, "Renewable Identification Nos. (RINs) and Government Biofuels Blending Mandates," *AgMRC Renewable Energy Newsletter* (Apr. 2009), available at http://www.agmrc.org/renewable_energy/biofuelsbiorefining_general/renewable-identification-numbers-rins-and-government-biofuels-blending-mandates/.
Qi et al. "Review of biomass pyrolysis oil properties and upgrading research," *Energy Conversion & Management*, 48 (2007) 87-92.
Office Action, U.S. Appl. No. 14/346,517, dated Sep. 25, 2015, available at www.uspto.gov.
Yoo et al. "Thermo-mechanical extrusion pretreatment for conversion of soybean hulls to fermentable sugars," *Bioresource Technology*, 102 (2011) 7583-7590.
Search Report, Intellectual Property Office of Singapore, dated Jun. 4, 2015, for corresponding SG 11201403208Y.
Written Opinion, Intellectual Property Office of Singapore, dated Jul. 31, 2015, for corresponding SG 11201403208Y.
Supplemental European Search Report, dated Sep. 4, 2015, for corresponding EP 12858367.1.
Extended European Search Report, dated Sep. 11, 2015, for corresponding EP 12858367.1.
International Search Report dated Feb. 17, 2012 for PCT/US2011/043295.
AccessScience Dictionary, "ebullating-bed reactor," http://www.accessscience.com, last visited Jul. 15, 2014.
Adam, J. "Catalytic conversion of biomass to produce higher quality liquid bio-fuels," *PhD Thesis*, Department of Energy and Process Engineering, The Norwegian University of Science and Technology, Trondheim (2005).
Adam, J. et al. "Pyrolysis of biomass in the presence of Al-MCM-41 type catalysts," *Fuel*, 84 (2005) 1494-1502.
Adjaye, John D. et al. "Catalytic conversion of a biomass-derived oil to fuels and chemicals I: Model compound studies and reaction pathways," *Biomass & Bioenergy*, 8:3 (1995) 131-149.
Adjaye, John D. et al. "Catalytic conversion of a biomass-derived oil to fuels and chemicals II: Chemical kinetics, parameter estimation and model predictions," *Biomass & Bioenergy*, 8:4 (1995) 265-277.
Adjaye, John D. et al. "Catalytic conversion of wood derived bio-oil to fuels and chemicals," *Studies in Surface Science and Catalysis*, 73 (1992) 301-308.
Adjaye, John D. et al. "Production of hydrocarbons by the catalytic upgrading of a fast pyrolysis bio-oil," *Fuel Process Technol*, 45:3 (1995) 161-183.
Adjaye, John D. et al. "Upgrading of a wood-derived oil over various catalysts," *Biomass & Bioenergy*, 7:1-6 (1994) 201-211.
Aho, A. et al. "Catalytic pyrolysis of woody biomass in a fluidized bed reactor; Influence of zeolites structure, Science Direct," *Fuel*, 87 (2008) 2493-2501.
Antonakou, E. et al. "Evaluation of various types of Al-MCM-41 materials as catalysts in biomass pyrolysis for the production of bio-fuels and chemicals," *Fuel*, 85 (2006) 2202-2212.
Atutxa, A. et al. "Kinetic Description of the Catalytic Pyrolysis of Biomass in a Conical Spouted Bed Reactor," *Energy Fuels*, 19:3 (2005) 765-774.
Baker, E. G. et al. "Catalytic Upgrading of Biomass Pyrolysis Oils," in Bridgwater, A. V. et al. (eds) *Research in Thermochemical Biomass Conversion*, Elsevier Science Publishers Ltd., Barking, England (1988) 883-895.
Baldauf, W. et al. "Upgrading of flash pyrolysis oil and utilization in refineries," *Biomass & Bioenergy*, 7 (1994) 237-244.
Baumlin, "The continuous self stirred tank reactor: measurement of the cracking kinetics of biomass pyrolysis vapours," *Chemical Engineering Science*, 60 (2005) 41-55.
Berg, "Reactor Development for the Ultrapyrolysis Process," *The Canadian Journal of Chemical Engineering*, 67 (1989) 96-101.
Bielansky, P. et al. "Catalytic conversion of vegetable oils in a continuous FCC pilot plant," *Fuel Processing Technology*, 92 (2011) 2305-2311.
Bimbela, F. et al. "Hydrogen production by catalytic steam reforming of acetic acid, a model compound of biomass pyrolysis liquids," *J. Ana App. Pyrolysis*, 79 (2007) 112-120.
Bridgwater et al. (eds) *Fast Pyrolysis of Biomass: A Handbook*, Newbury Cpl Press, Great Britain (2002) 12-13.
Bridgwater, A.V. "Principles and practices of biomass fast pyrolysis processes for liquids," *Journal of Analytical and Applied Pyrolysis*, 51 (1999) 3-22.
Bridgwater, Tony "Production of high grade fuels and chemicals from catalytic pyrolysis of biomass," *Catalysis Today*, 29 (1996) 285-295.
Bridgwater, Tony et al. "Transport fuels from biomass by thermal processing," *EU-China Workshop on Liquid Biofuels*, Beijing, China (Nov. 4-5, 2004).
Buchsbaum, A. et al. "The Challenge of the Biofuels Directive for a European Refinery," *OMW Refining and Marketing, ERTC 9th Annual Meeting*, Prague, Czech Republic (Nov. 15-17, 2004).
Carlson, T. et al. "Aromatic Production from Catalytic Fast Pyrolysis of Biomass-Derived Feedstocks," *Top Catal*, 52 (2009) 241-242.
Carlson., T. et al. "Green Gasoline by Catalytic Fast Pyrolysis of Solid Biomass Derived Compounds," *ChemSusChem*, 1 (2008) 397-400.
Cass et al. "Challenges in the Isolation of Taxanes from *Taxus canadensis* by Fast Pyrolysis," *J Analytical and Applied Pyrolysis* 57 (2001) 275-285.
Chantal, P. D. et al. "Production of Hydrocarbons from Aspen Poplar Pyrolytic Oils over H-ZSM5," *Applied Catalysis*, 10 (1984) 317-332.
Chen, N. Y. et al. "Fluidized Upgrading of Wood Pyrolysis Liquids and Related Compounds," in Soltes, E. J. et al. (eds) *Pyrolysis Oils from Biomass*, ACS, Washington, DC (1988) 277-289.
Chinsuwan, A. et al. "An experimental investigation of the effect of longitudinal fin orientation on heat transfer in membrane water wall tubes in a circulating fluidized bed," *International Journal of Heat and Mass Transfer*, 52:5-6 (2009) 1552-1560.
Cornelissen, T. et al., "Flash co-pyrolysis of biomass with polylactic acid. Part 1: Influence on bio-oil yield and heating value," *Fuel* 87 (2008) 1031-1041.
Cousins, A. et al. "Development of a bench-scale high-pressure fluidized bed reactor and its sequential modification for studying diverse

(56) References Cited

OTHER PUBLICATIONS aspects of pyrolysis and gasification of coal and biomass," *Energy and Fuels*, 22:4 (2008) 2491-2503.

Cragg et al. "The Search for New Pharmaceutical Crops: Drug Discovery and Development at the National Cancer Institute," in Janick, J. and Simon, J.E. (eds) *New Crops*, Wiley, New York (1993) 161-167.

Czernik, S. et al. "Hydrogen from biomass-production by steam reforming of biomass pyrolysis oil," *Catalysis Today*, 129 (2007) 265-168.

Czernik, S. et al. "Hydrogren by Catalytic Steam Reforming of Liquid Byproducts from Biomass Thermoconversion Processes," *Ind. Eng. Chern. Res.*, 41 (2002) 4209-4215.

Dahmen, "Rapid pyrolysis for the pretreatment of biomass and generation of bioslurry as intermediate fuel", *Chemie-Ingenieur-Technik*, 79:9 (2007) 1326-1327. Language: German (Abstract only; Machine translation of Abstract).

Dandik, "Catalytic Conversion of Used Oil to Hydrocarbon Fuels in a Fractionating Pyrolysis Reactor," *Energy & Fuels*, 12 (1998) 1148-1152.

Daoust et al. "Canada Yew (*Taxus canadensis* Marsh.) and Taxanes: a Perfect Species for Field Production and Improvement through Genetic Selection," Natural Resources Canada, Canadian Forest Service, Sainte-Fov, Quebec (2003).

de Wild, P. et al. "Lignin valorisation for chemicals and (transportation) fuels via (catalytic) pyrolysis and hydrodeoxygenation," *Environ. Prog. Sustainable Energy*, 28 (2009) 461-469.

Demirbas, Ayhan "Fuel Conversional Aspects of Palm Oil and Sunflower Oil," *Energy Sources*, 25 (2003) 457-466.

Di Blasi, C. et al. "Effects of Potassium Hydroxide Impregnation of Wood Pyrolysis, American Chemical Society," *Energy & Fuels* 23 (2009) 1045-1054.

Ellioti, D. "Historical Developments in Hydroprocessing Bio-oils," *Energy & Fuels*, 21 (2007) 1792-1815.

Ensyn Technologies Inc. "Catalytic de-oxygenation of biomass-derived RTP vapors." Prepared for ARUSIA, Agenzia Regionale Umbria per lo Sviluppo e L'Innovazione, Perugia, Italy (Mar. 1997).

Filtration, Kirk-Othmer Encyclopedia of Chemical Technology 5th Edition. vol. 11., John Wiley & Sons, Inc., Feb. 2005.

Gayubo, A. G. et al. "Deactivation of a HZSM-5 Zeolite Catalyst in the Transformation of the Aqueous Fraction of Biomass Pyrolysis Oil into Hydrocarbons," *Energy & Fuels*, 18:6 (2004) 1640-1647.

Gayubo, A. G. et al. "Undesired components in the transformation of biomass pyrolysis oil into hydrocarbons on an HZSM-5 zeolite catalyst," *J Chem Tech Biotech*, 80 (2005) 1244-1251.

Gevert, Börjie S. et al. "Upgrading of directly liquefied biomass to transportation fuels: catalytic cracking," *Biomass* 14:3 (1987) 173-183.

Goesele, W. et al., Filtration, Wiley-VCH Verlag GmbH & Co. KGaA, Weinheim, 10.1002/14356007.b0210, 2005.

Grange, P. et al. "Hydrotreatment of pyrolysis oils from biomass: reactivity of the various categories of oxygenated compounds and preliminary techno-economical study," *Catalysis Today*, 29 (1996) 297-301.

Hama, "Biodiesel-fuel production in a packed-bed reactor using lipase-producing Rhizopus oryzae cells immobilized within biomass support particles", *Biochemical Engineering Journal*, 34 (2007) 273-278.

Hoekstra, E. et al., "Fast Pyrolysis of Biomass in a Fluidized Bed Reactor: In Situ Filtering of the Vapors," *Ind. Eng. Chern. Res.*, 48:10 (2009) 4744-4756.

Holton et al. "First Total Synthesis of Taxol. 2. Completion of the C and D Rings," *J Am Chem Soc*, 116 (1994) 1599-1600.

Horne, Patrick A. et al. "Catalytic coprocessing of biomass-derived pyrolysis vapours and methanol," *J. Analytical and Applied Pyrolysis*, 34:1 (1995) 87-108.

Horne, Patrick A. et al. "Premium quality fuels and chemicals from the fluidised bed pyrolysis of biomass with zeolite catalyst upgrading," *Renewable Energy*, 5:5-8 (1994) 810-812.

Horne, Patrick A. et al. "The effect of zeolite ZSM-5 catalyst deactivation during the upgrading of biomass-derived pyrolysis vapours," *J Analytical and Applied Pyrolysis*, 34:1 (1995) 65-85.

Huang et al. "New Taxanes from *Taxus brevifolia*," *J of Natural Products*, 49 (1986) 665-669.

Huffman, D. R. et al., Ensyn Technologies Inc., "Thermo-Catalytic Cracking of Wood to Transportation Fuels," DSS Contract No. 38SQ.23440-4-1429, Efficiency and Alternative Energy Technology Branch, Natural Resources Canada, Ottawa, Canada (1997).

Huffman, D. R., Ensyn Technologies Inc., "Thermo-catalytic cracking of wood to transportation fuels using the RTP process," DSS Contract No. 38SQ.23440-4-1429, Efficiency and Alternative Energy Technology Branch, Natural Resources Canada, Ottawa, Ontario (Jan. 1997).

Hughes, J. et al. "Structural variations in natural F, OH and Cl apatites," *American Mineralogist*, 74 (1989) 870-876.

Huie, C. W. "A review of modern sample-preparation techniques for the extraction and analysis of medicinal plants," *Anal Bioanal Chem*, 373 (2002) 23-30.

International Search Report dated Feb. 22, 2013 for corresponding International Application No. PCT/US2012/68876.

Ioannidou, "Investigating the potential for energy, fuel, materials and chemicals production from corn residues (cobs and stalks) by non-catalytic and catalytic pyrolysis in two reactor configurations," *Renewable and Sustainable Energy Reviews*, 13 (2009) 750-762.

Iojoiu, E. et al. "Hydrogen production by sequential cracking of biomass-derived pyrolysis oil over noble metal catalysts supported on ceria-zirconia," *Applied Catalysis A: General*, 323 (2007) 147-161.

Jackson, M. et al. "Screening heterogenous catalysts for the pyrolysis of lignin," *J. Anal. Appl. Pyrolysis*, 85 (2009) 226-230.

Junming et al. "Bio-oil upgrading by means of ethyl ester production in reactive distillation to remove water and to improve storage and fuel characteristics," *Biomass and Energy*, 32 (2008) 1056-1061.

Kalnes, Tom et al. "Feedstock Diversity in the Refining Industry," UOP Report to NREL and DOE (2004).

Khanal, "Biohydrogen Production in Continuous-Flow Reactor Using Mixed Microbial Culture," *Water Environment Research*, 78:2 (2006) 110-117.

Khimicheskaya Entsiklopediya. Pod red. N. S. Zefirov. Moskva, Nauchnoe Izdatelstvo "Bolshaya Rossyskaya Entsiklopediya", 1995, p. 133-137,529-530.

Kingston et al. "New Taxanes from *Taxus brevifolia*," *J of Natural Products*, 45 (1982) 466-470.

Lappas, A. A. et al. "Biomass pyrolysis in a circulating fluid bed reactor for the production of fuels and chemicals," *Fuel*, 81 (2002) 2087-2095.

Lappas, A.A. et al. "Production of Transportation Fuels from Biomass," Workshop of Chemical Process Engineering Research Institute/Center for Research and Technology Hellas, Thermi-Thessaloniki, Greece (2004).

Lappas, A.A., "Production of biofuels via co-processing in conventional refining process," *Catalysis Today*, 145 (2009) 55-62.

Maiti, R.N. et al. "Gas-liquid distributors for trickle-bed reactors: A review"; *Industrial and Engineering Chemistry Research*, 46:19 (2007) 6164-6182.

Mancosky, "The use of a controlled cavitation reactor for bio-diesel production," (abstract only), AIChE Spring National Meeting 2007, Houston, Texas.

Marker, Terry L., et al. "Opportunities for Biorenewables in Petroleum Refineries," Proceedings of the 230th ACS National Meeting, Washington, DC, Paper No. 125, Fuel Division (Aug. 31, 2005) (abstract only).

Marker, Terry L. et al., UOP, "Opportunities for Biorenewables in Oil Refineries," Final Technical Report, U.S. Department of Energy Award No. DE-FG36-05G015085, Report No. DOEG015085Final (2005).

Marquevich, "Hydrogen from Biomass: Steam Reforming of Model Compounds of Fast-Pyrolysis Oil," *Energy & Fuels*, 13 (1999) 1160-1166.

Masoumifard, N. et al. "Investigation of heat transfer between a horizontal tube and gas-solid fluidized bed," *International Journal of Heat and Fluid Flow*, 29:5 (2008) 1504-1511.

(56) References Cited

OTHER PUBLICATIONS

McLaughlin et al. 19-Hydroxybaccatin III, 10-Deacetylcephalo-Mannine, and 10-Deacetyltaxol: New Anti-Tumor Taxanes from *Taxus wallichiana*, *J of Natural Products*, 44 (1981) 312-319.
McNeil "Semisynthetic Taxol Goes on Market Amid Ongoing Quest for New Versions," *J of the National Cancer Institute*, 87:15 (1995) 1106-1108.
Meier, D. et al. "State of the art of applied fast pyrolysis of lignocellulosic materials—a review," *Bioresource Technology*, 68:1 (1999) 71-77.
Meier, D. et al., "Pyrolysis and Hydroplysis of Biomass and Lignins—Activities at the Institute of Wood Chemistry in Hamburg, Germany," vol. 40, No. 2, Preprints of Papers Presented at the 209th ACS National Meeting, Anaheim, CA (Apr. 2-7, 1995).
Mercader, F. et al. "Pyrolysis oil upgrading by high pressure thermal treatment," *Fuel*, 89:10 (2010) 2829-2837.
Miller et al. "Antileukemic Alkaloids from *Taxus wallichiana* Zucc," *J Org Chem*, 46 (1981) 1469-1474.
Mohan, D. et al. "Pyrolysis of Wood/Biomass for Bio-oil: A Critical Review," *Energy Fuels*, 20:3 (2006) 848-849.
Newton "Taxol: A Case Study in Natural Products Chemistry," Lecture Notes, University of Southern Maine, http:/www.usm.maine.edu/(2009) 1-6.
Nicolaou et al. "Total Synthesis of Taxol," *Nature*, 367 (1994) 630-634.
Nowakowski, D. et al. "Potassium catalysis in the pyrolysis behaviour of short rotation willow coppice," *Fuels*, 86 (2007) 2389-2402.
Ognisty, T. P. "The direct contact heat transfer performance of a spray nozzle, a notched through distributor, and two inch Pall rings," AlChE 1990 Spring National Meeting (Orlando Mar. 18-22, 1990) Preprint N. 37c 36P, Mar. 18, 1990.
Ohman "Bed Agglomeration Characteristics during Fluidized Bed Combustion of Biomass Fuels," *Energy & Fuels*, 14 (2000) 169-178.
Okumura, Y. et al. "Pyrolysis and gasification experiments of biomass under elevated pressure condition," Nihon Kikai Gakkai Ronbunshu, B Hen/Transactions of the Japan Society of Mechanical Engineers, Part B, vol. 73, No. 7, 2007, pp. 1434-1441.
Olazar, M. et al. "Pyrolysis of Sawdust in a Conical Spouted-Bed Reactor with a HZSM-5 Catalyst," *AlChE Journal*, 46:5 (2000) 1025-1033.
Onay "Influence of pyrolysis temperature and heating rate on the production of bio-oil and char from safflower seed by pyrolysis, using a well-swept fixed-bed reactor," *Fuel Processing Technology*, 88 (2007) 523-531.
Onay, "Production of Bio-Oil from Biomass: Slow Pyrolysis of Rapeseed (*Brassica napus* L.) in a Fixed-Bed Reactor," *Energy Sources*, 25 (2003) 879-892.
Ong et al. "Pressurized hot water extraction of bioactive or marker compounds in botanicals and medicinal plant materials," *J Chromatography A*, 1112 (2006) 92-102.
Ooi, Y. S. et al. "Catalytic Cracking of Used Palm Oil and Palm Oil Fatty Acids Mixture for the Production of Liquid Fuel: Kinetic Modeling," *J Am Chem Soc*, 18 (2004) 1555-1561.
Otterstedt, J. E. et al. "Catalytic Cracking of Heavy Oils," in Occelli, Mario L. (ed) Fluid Catalytic Cracking, Chapter 17, ACS, Washington, DC (1988) 266-278.
Padmaja, K.V. et al. "Upgrading of Candelilla biocrude to hydrocarbon fuels by fluid catalytic cracking," *Biomass and Bioenergy*, 33 (2009) 1664-1669.
Pavia et al., Intro to Org Labo Techniques (1988) 3d ed. Saunders College Publishing, Washington p. 62-66, 541-587.
PCT/US2012/055384 International Search Report, dated Mar. 28, 2013, and International Preliminary Report on Patentability, dated Mar. 25, 2014.
Pecora, A.A.B. et al., "Heat transfer coefficient in a shallow fluidized bed heat exchanger with a continuous ftow of solid particles," *Journal of the Brazilian Society of Mechanical Sciences and Engineering*, 28:3 (2006) 253-258.

Pecora, A.A.B., et al., "An analysis of process heat recovery in a gas-solid shallow fluidized bed," *Brazilian Journal of Chemical Engineering*, 23:4 (2006) 497-506.
Petrik, P.T. et al. "Heat exchange in condensation of R227 coolant on inclined tubes placed in a granular Bed," *Journal of Engineering Physics and Thermophysics*, 77:4 (2004) 758-761.
Prasad Y. S. et al. "Catalytic conversion of canola oil to fuels and chemical feedstocks. Part II. Effect of co-feeding steam on the performance of HZSM-5 catalyst," *Can J Chem Eng*, 64 (1986) 285-292.
Prins, Wolter et al. "Progress in fast pyrolysis technology," *Topsoe Catalysis Forum 2010*, Munkerupgaard, Denmark (Aug. 19-20, 2010).
Radlein, D. et al. "Hydrocarbons from the Catalytic Pyrolysis of Biomass," *Energy & Fuels*, 5 (1991) 760-763.
Rao "Taxol and Related Taxanes. I. Taxanes of *Taxus brevifolia* Bark," *Pharm Res* 10:4 (1993) 521-524.
Rao et al. "A New Large-Scale Process for Taxol and Related Taxanes from *Taxus brevifolia*," *Pharm Res*, 12:7 (1995) 1003-1010.
Ravindranath, G., et al., "Heat transfer studies of bare tube bundles in gas-solid fluidized bed", 9th International Symposium on Fluid Control Measurement and Visualization 2007, Flucome 2007, vol. 3, 2007, pp. 1361-1369.
Rodriguez, O.M.H. et al. "Heat recovery from hot solid particles in a shallow fluidized bed," *Applied Thermal Engineering*, 22:2 (2002) 145-160.
Samolada, M. C. et al. "Production of a bio-gasoline by upgrading biomass flash pyrolysis liquids via hydrogen processing and catalytic cracking," *Fuel*, 77:14 (1998) 1667-1674.
Sang "Biofuel Production from Catalytic Cracking of Palm Oil," *Energy Sources*, 25 (2003) 859-869.
Scahill, J. et al. "Removal of Residual Char Fines from Pyrolysis Vapors by Hot Gas Filtration," in Bridgwater, A. V. et al. (eds) *Developments in Thermochemical Biomass Conversion*, Springer Science+Business Media, Dordrecht (1997) 253-266.
Scott, D. et al. *Pretreatment of poplar wood for fast pyrolysis: rate of cation removal*, Journal of Analytical and Applied Pyrolysis, 57 (2000) 169-176.
Senilh et al. "Mise en Evidence de Nouveaux Analogues du Taxol Extraits de *Taxus baccata*," *J of Natural Products*, 47 (1984) 131-137. (English Abstract included).
Sharma, R. "Upgrading of pyrolytic lignin fraction of fast pyrolysis oil to hydrocarbon fuels over HZSM-5 in a dual reactor system," *Fuel Processing Technology*, 35 (1993) 201-218.
Sharma, R. K. et al. "Catalytic Upgrading of Pyrolysis Oil," *Energy & Fuels*, 7 (1993) 306-314.
Sharma, R. K. et al. "Upgrading of wood-derived bio-oil over HZSM-5," *Bioresource Technology*, 35:1 (1991) 57-66.
Smith R.M. "Extractions with superheated water," *J Chromatography A*, 975 (2002) 31-46.
Snader "Detection and Isolation," in Suffness, M. (ed) *Taxol-Science and Applications*, CRC Press, Boca Raton, Florida (1995) 277-286.
Srinivas, S.T. et al "Thermal and Catalytic Upgrading of a Biomass-Derived Oil in a Dual Reaction System," *Can. J. Chem. Eng.*, 78 (2009) 343-354.
Stierle et al. "The Search for Taxol-Producing Microorganism Among the Endophytic Fungi of the Pacific Yew, *Taxus brevifolia*," *J of Natural Products*, 58 (1995) 1315-1324.
Stojanovic, B. et al. "Experimental investigation of thermal conductivity coefficient and heat exchange between fluidized bed and inclined exchange surface," *Brazilian Journal of Chemical Engineering*, 26:2 (2009) 343-352.
Sukhbaatar, B. "Separation of Organic Acids and Lignin Fraction From Bio-Oil and Use of Lignin Fraction in Phenol-Formaldehyde Wood Adhesive Resin," *Master's Thesis*, Mississippi State (2008).
Twaiq, A. A. et al. "Performance of composite catalysts in palm oil cracking for the production of liquid fuels and chemicals," *Fuel Processing Technology*, 85 (2004) 1283-1300.
Twaiq, F. A. et al. "Liquid hydrocarbon fuels from palm oil by catalytic cracking over aluminosilicate mesoporous catalysts with various Si/Al ratios," *Microporous and Mesoporous Materials*, 64 (2003) 95-107.

(56) References Cited

OTHER PUBLICATIONS

Tyson, K. et al. "Biomass Oil Analysis: Research Needs and Recommendations," National Renewable Energy Laboratory, Report No. NREL/TP-510-34796 (Jun. 2004).

Valle, B. et al. "Integration of Thermal Treatment and Catalytic Transformation for Upgrading Biomass Pyrolysis Oil," *International Journal of Chemical Reactor Engineering*, 5:1 (2007).

Vasanova, L.K. "Characteristic features of heat transfer of tube bundles in a cross water-air flow and a three-phase fluidized bed," *Heat Transfer Research*, 34:5-6 (2003) 414-420.

Vitolo, S. et al. "Catalytic upgrading of pyrolytic oils over HZSM-5 zeolite: behaviour of the catalyst when used in repeated upgrading—regenerating cycles," *Fuel*, 80 (2001) 17-26.

Vitolo, S. et al. "Catalytic upgrading of pyrolytic oils to fuel over different zeolites," *Fuel*, 78:10 (1999) 1147-1159.

Wang, Xianhua et al., "The Influence of Microwave Drying on Biomass Pyrolysis," *Energy & Fuels* 22 (2008) 67-74.

Westerhof, Roel J. M. et al., "Controlling the Water Content of Biomass Fast Pyrolysis Oil," *Ind. Eng. Chem. Res.* 46 (2007) 9238-9247.

Williams, Paul T. et al. "Characterisation of oils from the fluidised bed pyrolysis of biomass with zeolite catalyst upgrading," *Biomass and Bioenergy*, 7:1-6 (1994) 223-236.

Williams, Paul T. et al. "Comparison of products from the pyrolysis and catalytic pyrolysis of rice husks," *Energy*, 25:6 (2000) 493-513.

Williams, Paul T. et al. "The influence of catalyst type on the composition of upgraded biomass pyrolysis oils," *J Analytical and Applied Pyrolysis*, 31 (1995) 39-61.

Yukimune et al. "Methyl Jasmonate-induced Overproduction of Paclitaxel and Baccatin III in Taxus Cell Suspension Cultures," *Nature Biotechnology* 14 (1996) 1129-1132.

Zhang et al. "Investigation on initial stage of rapid pyrolysis at high pressure using Taiheiyo coal in dense phase," *Fuel*, 81:9 (2002) 1189-1197.

Zhang, "Hydrodynamics of a Novel Biomass Autothermal Fast Pyrolysis Reactor: Flow Pattern and Pressure Drop," *Chem. Eng. Technol.*, 32:1 (2009) 27-37.

\* cited by examiner

CHAR-HANDLING PROCESSES IN A PYROLYSIS SYSTEM

CROSS REFERENCE TO RELATED APPLICATIONS

This application is the National Phase application of International Application No. PCT/US2011/043295, filed Jul. 8, 2011, which designates the United States and was published in English, and which further claims the benefit of priority to, U.S. application Ser. No. 12/837,376, filed Jul. 15, 2010, now U.S. Pat. No. 8,499,702, granted Aug. 6, 2013. All of the foregoing related applications, in their entirety, are incorporated herein by reference.

FIELD OF THE INVENTION

The present invention generally relates to char-handling processes in a pyrolysis system, and more particularly relates to char-handling processes for controlling the overall heat balance, ash accumulation, and afterburn in a reheater of a pyrolysis system.

DESCRIPTION OF RELATED ART

Pyrolysis is a thermal process during which solid carbonaceous biomass feedstock, i.e., "biomass", such as wood, agricultural wastes/residues, algae, forestry byproducts, cellulose and lignin, municipal waste, construction/demolition debris, or the like, is rapidly heated to pyrolysis temperatures of 300° C. to 900° C. in the absence of air using a pyrolysis reactor. Biomass may be pyrolyzed using various pyrolysis methods, including the Rapid Thermal Process method and catalytic pyrolysis. Under these conditions, solid and gaseous pyrolysis products are formed. The gaseous pyrolysis products ("pyrolysis gases") comprise a non-condensable portion and a condensable portion (vapors) that can be condensed into liquid biomass-derived pyrolysis oil. The solid pyrolysis products include combustible solids containing carbon, referred to as "char".

As known in the art, heat for the endothermic pyrolysis reaction is produced in a reheater zone of a pyrolysis reactor or in a separate reheater (collectively referred to herein as a "reheater") by combusting the non-condensable pyrolysis gases and the combustible solids produced in the pyrolysis reaction. Heat is transferred from the reheater to the pyrolysis reactor by a "heat transfer medium." While the heat for the endothermic pyrolysis reaction and ambient heat losses (collectively "heat demand") are normally balanced with the heat supplied from combustion in the reheater, heat balance is not always achieved. Pyrolysis of certain types of biomass generates considerably more combustible solids and thus more thermal energy than is required to meet the heat demand of the pyrolysis reactor. If too much heat is generated, large quantities of excess dilution air or the addition of expensive cooling systems may be required for the pyrolysis system.

The heat transfer medium typically comprises inert solids such as sand. In catalytic pyrolysis, catalytic solids may be used, instead of or in addition to the inert solids, as the heat transfer medium. During pyrolysis, the combustible solids mix with the inert solids, the catalytic solids if present, or both, forming spent heat transfer medium. Spent heat transfer medium has a reduced ability to transfer heat, and in the case of catalytic solids, also has a reduced catalytic activity. To restore the heat transfer medium, the spent heat transfer medium is continuously transferred from the pyrolysis reactor to the reheater after separation from the pyrolysis gases. The spent heat transfer medium is regenerated in the reheater by combusting the combustible solids in the mixture. The regenerated heat transfer medium is then recirculated to the pyrolysis reactor.

When the combustible solids are combusted in the reheater, the metals therein, typically the alkaline metals, are released as ash to mix with the regenerated heat transfer medium. As ash is continuously produced in the pyrolysis system, ash removal is necessary to balance the pyrolysis system. When the regenerated heat transfer medium is recirculated to the pyrolysis reactor with ash present, pyrolysis of the biomass may be disadvantageously affected by increased gas production.

The heat transfer medium is maintained as a fluidized dense bed in a lower portion of the reheater by the upward passage of an oxygen-containing regeneration gas stream through the fluidized dense bed. Reheater flue gas is in a dilute phase in an upper portion of the reheater. During regeneration of the spent heat transfer medium in the reheater, a portion of the combustible solids become entrained in the reheater flue gas. The short height of the dense bed in the reheater and the small size and low density of the combustible solids results in a considerable amount of the combustible solids escaping from the dense bed and burning in the dilute phase (so-called "afterburning"). The combustible solids may also be "blown" from the dense bed into the dilute phase because of the velocity (typically 0.76 meters to 0.91 meters/second (2.5-3 feet/second)) of the oxygen-containing regeneration gas up through the dense bed into the reheater flue gas in the dilute phase. Afterburning may also occur in the plenum and flue gas transfer lines through which the flue gas exits the reheater, rather than in the dense bed of the reheater.

In addition to afterburning of the combustible solids, afterburning of the carbon monoxide in the oxygen-containing regeneration gas to $CO_2$ in the dilute phase may occur. Reheaters typically are designed to operate so that substantially all of the carbon monoxide (CO) in the oxygen-containing regeneration gas combusts to form carbon dioxide ($CO_2$), thereby imparting the heat of reaction to the reheater. However, there may be incomplete combustion of the dilute phase flue gas CO to $CO_2$ or incomplete consumption of $O_2$ in the dilute phase. Either problem also gives rise to afterburning. Afterburning is exothermic, and either must be quenched by additional injection of the oxygen-containing regeneration gas or the flue gas must absorb the heat of combustion, which undesirably decreases the amount of heat transferred to the dense bed.

Accordingly, it is desirable to provide processes for controlling the overall heat balance, ash accumulation, and afterburn in a reheater of a pyrolysis system. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Processes are provided for pyrolysis of a carbonaceous biomass feedstock in a pyrolysis system. In accordance with one exemplary embodiment, the process comprises pyrolyzing carbonaceous biomass feedstock using a heat transfer medium forming pyrolysis products and a spent heat transfer medium. The spent heat transfer medium is separated into segregated char and char-depleted spent heat transfer medium. The char-depleted spent heat transfer medium is introduced into a dense bed of heat transfer medium fluidized by a stream of oxygen-containing regeneration gas.

Processes are provided for controlling heat balance, afterburn, and ash accumulation in a reheater in accordance with yet another exemplary embodiment of the present invention. The process comprises separating spent heat transfer medium from a pyrolysis reactor into char-depleted spent heat transfer medium and segregated char. The char-depleted spent heat transfer medium is introduced into a fluidized dense bed of heat transfer medium. The fluidized dense bed is maintained by a stream of oxygen-containing regeneration gas and a dilute phase above the fluidized dense bed. At least a portion of the segregated char is introduced into the fluidized dense bed of the reheater below the elevation where the char-depleted spent heat transfer medium is introduced, into the stream of oxygen-containing regeneration gas outside of the reheater, or both, to combust the segregated char below the dilute phase.

Processes are provided for controlling heat balance, afterburn, and ash accumulation in a reheater in accordance with yet another exemplary embodiment of the present invention. The reheater includes a fluidized dense bed of heat transfer medium and a dilute phase. The dilute phase is positioned above the fluidized dense bed. The process comprises substantially separating char from a spent heat transfer medium to form segregated char and char-depleted spent heat transfer medium. The char-depleted spent heat transfer medium comprises a mixture of residual char and inert solids, catalytic solids, or both. The char-depleted spent heat transfer medium is introduced into the reheater combusting the residual char to convert the char-depleted spent heat transfer medium into a heat transfer medium using an oxygen-containing regeneration gas. The oxygen-containing regeneration gas is introduced into the reheater through an inlet riser. The segregated char is combusted with an effective amount of the heat transfer medium from the fluidized dense bed in the oxygen-containing regeneration gas outside the reheater.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various exemplary embodiments of the present invention are directed to processes for handling combustible solids (hereinafter "combustible solids" or "char" produced during pyrolysis of carbonaceous biomass feedstock). Char is segregated from a heat transfer medium to control afterburn in a reheater during regeneration of the heat transfer medium. A portion of the segregated char may be exported to control the overall heat balance and accumulation of ash in the pyrolysis system.

Figure 1:
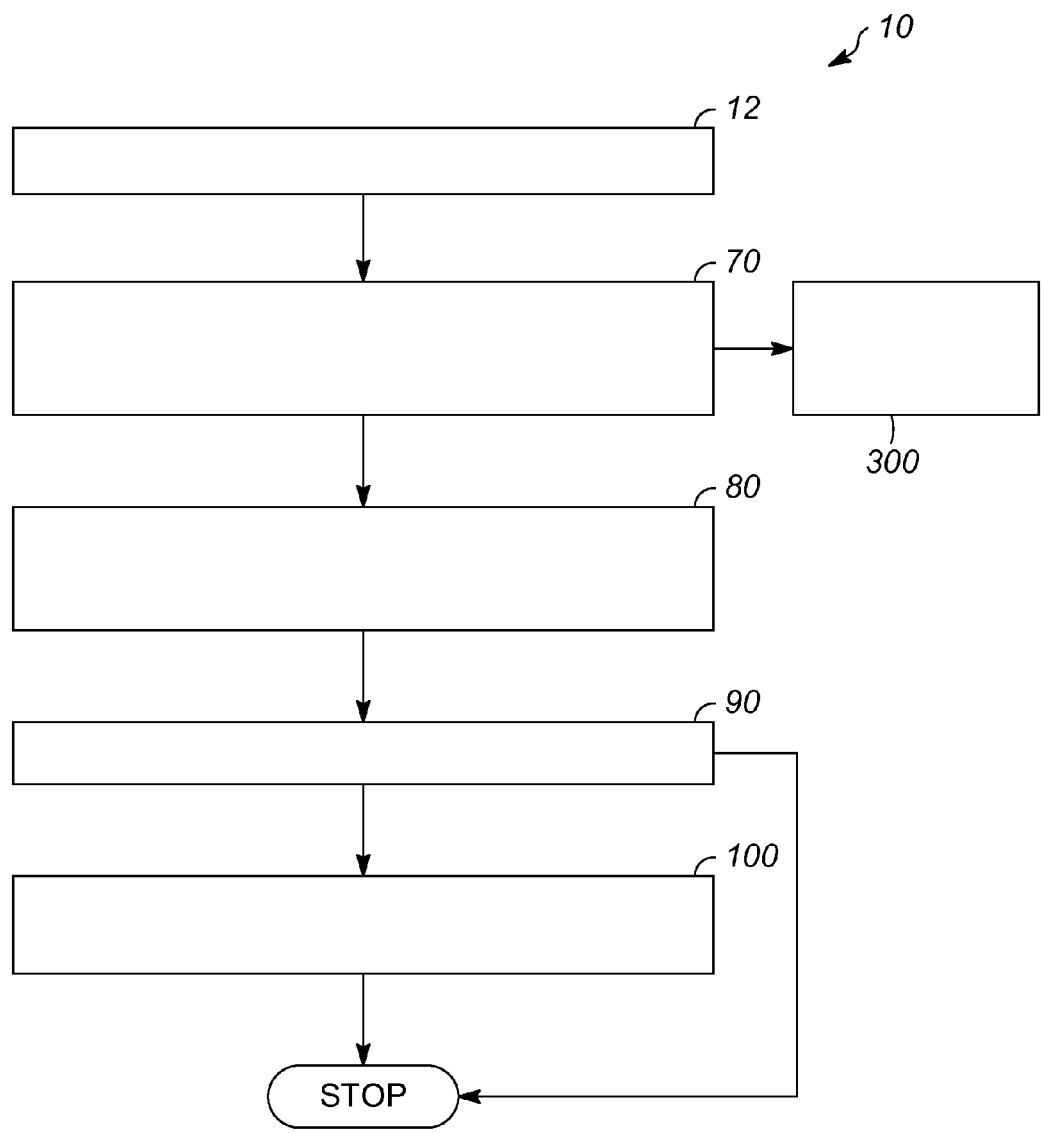
FIG. 1 is a flow chart of a char-handling process, according to exemplary embodiments of the present invention.
Figure 2:
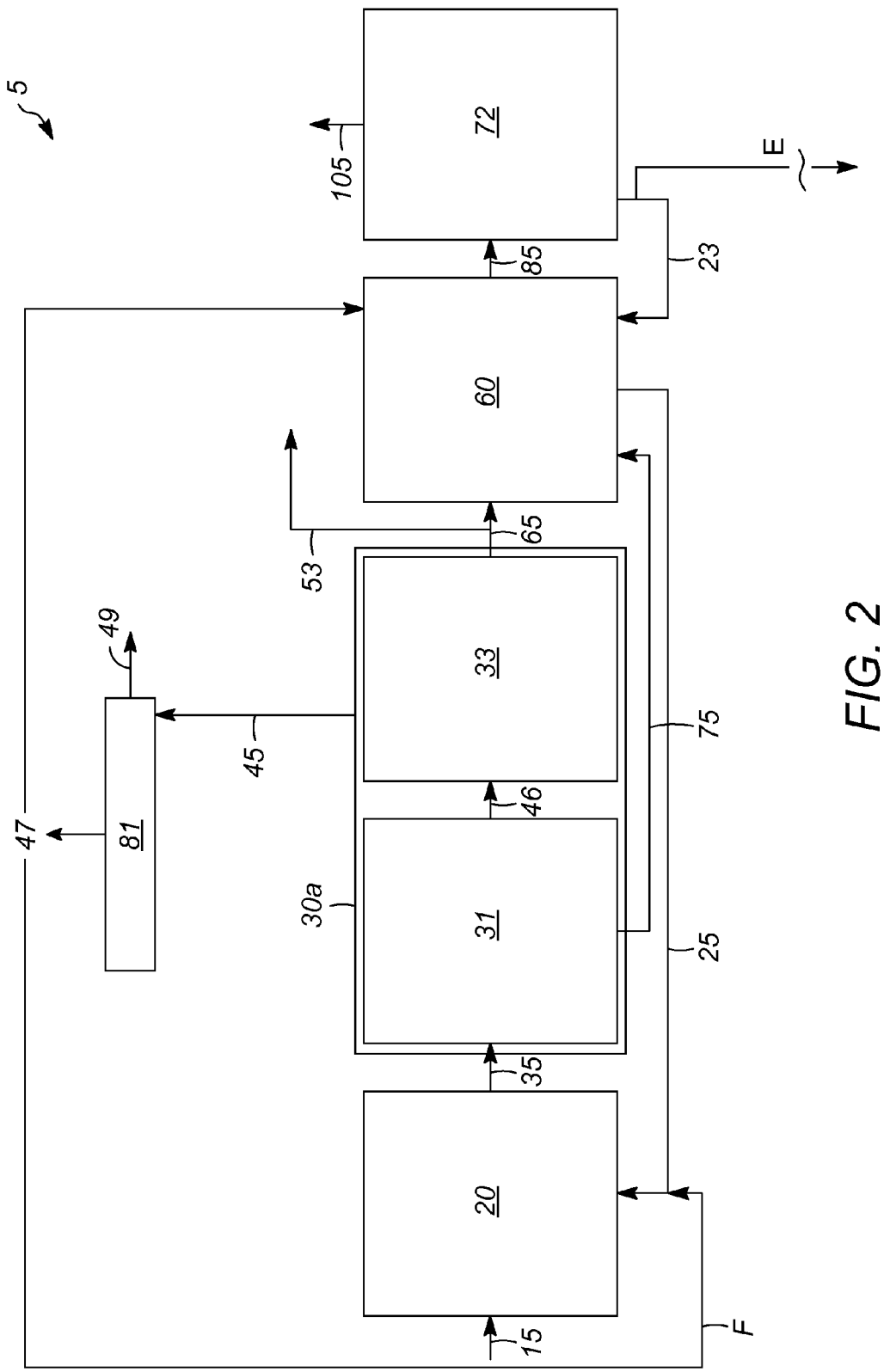
FIG. 2 is a diagram of an exemplary overall pyrolysis process apparatus including a dual stage cyclone separator of a gas-solid separator, in accordance with exemplary embodiments of the present invention.

FIG. 1 is a flow chart of a char-handling process 10, in accordance with an exemplary embodiment of the present invention. FIG. 2 illustrates a pyrolysis system 5 that uses the process 10 of FIG. 1. Referring to FIGS. 1 and 2, the process 10 begins by pyrolyzing carbonaceous biomass feedstock 15 (hereinafter "biomass") in a pyrolysis reactor 20 using a heat transfer medium and forming pyrolysis products and a spent heat transfer medium (step 12). The spent heat transfer medium leaving the pyrolysis reactor is entrained in gaseous pyrolysis products ("pyrolysis gases"), the pyrolysis gases with entrained spent heat transfer medium referred to in FIG. 2 with the reference numeral 35. As noted previously, the pyrolysis products comprise solid and gaseous pyrolysis products. Gaseous pyrolysis products 45 comprise a condensable portion and a non-condensable portion 47. The condensable portion may be condensed into liquid biomass-derived pyrolysis oil 49. The solid pyrolysis products include combustible solids containing carbon (also referred to herein as "char").

The heat transfer medium comprises inert solids, such as sand, catalytic solids, or both. The heat transfer medium leaving the pyrolysis reactor is said to be "spent", because it contains the combustible carbon-containing solids from the pyrolysis process. The gaseous pyrolysis products with entrained spent heat transfer medium 35 are transferred from the pyrolysis reactor 20 to a gas-solid separator 30a (FIG. 2) for separating the gaseous pyrolysis products 45 from the spent heat transfer medium and separating the spent heat transfer medium into separate streams of segregated char 65 and char-depleted spent heat transfer medium 75 (step 70). The term "char-depleted spent heat transfer medium" as used herein means both spent heat transfer medium from which all char has been removed and spent heat transfer medium from which a portion of the char has been removed but residual char remains.

Figure 3A:
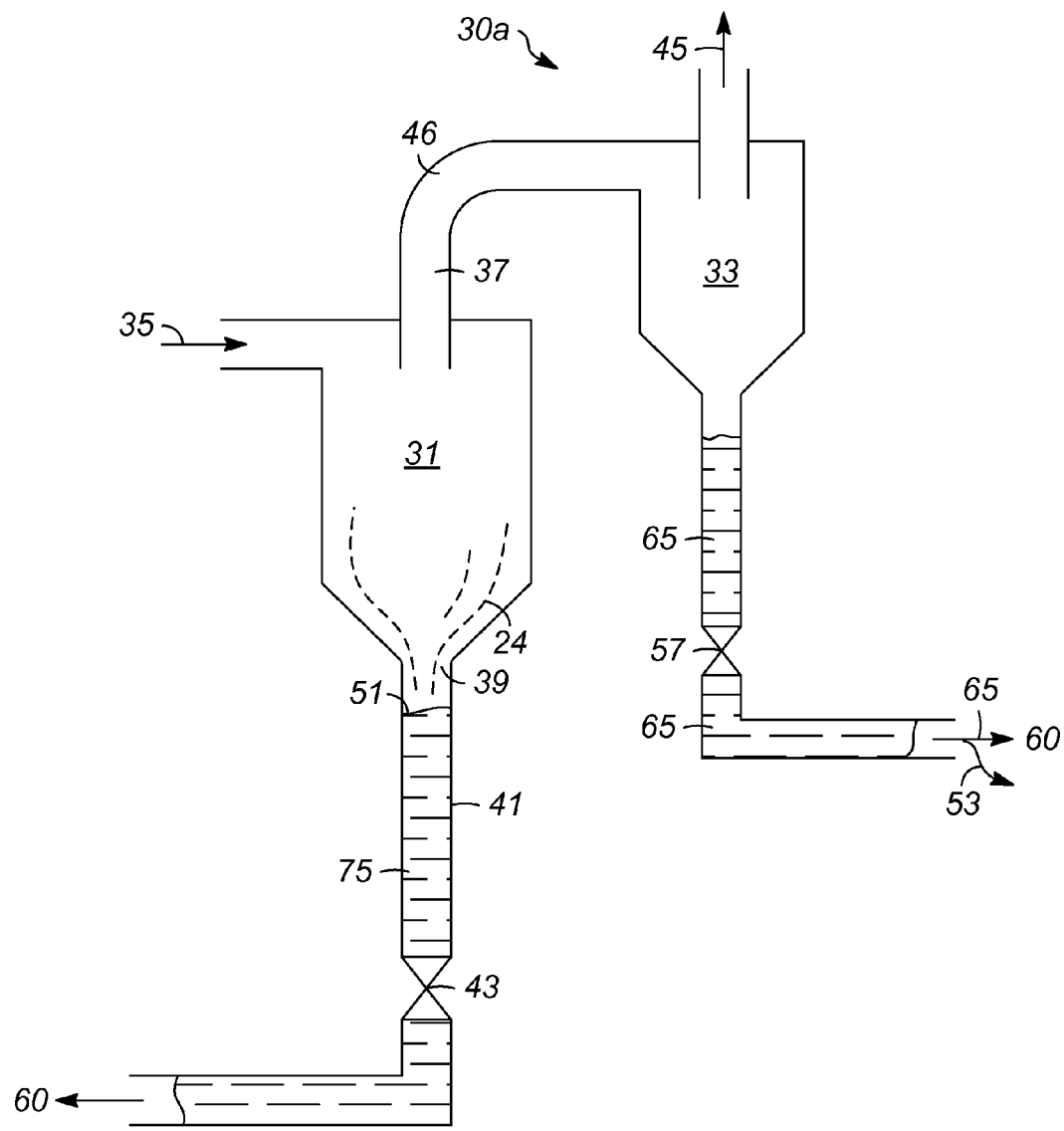
FIGS. 3A and 3B are schematic diagrams of different modes of operation in the dual stage cyclone separator of FIG. 2, in accordance with various exemplary embodiments of the present invention.
Figure 3B:
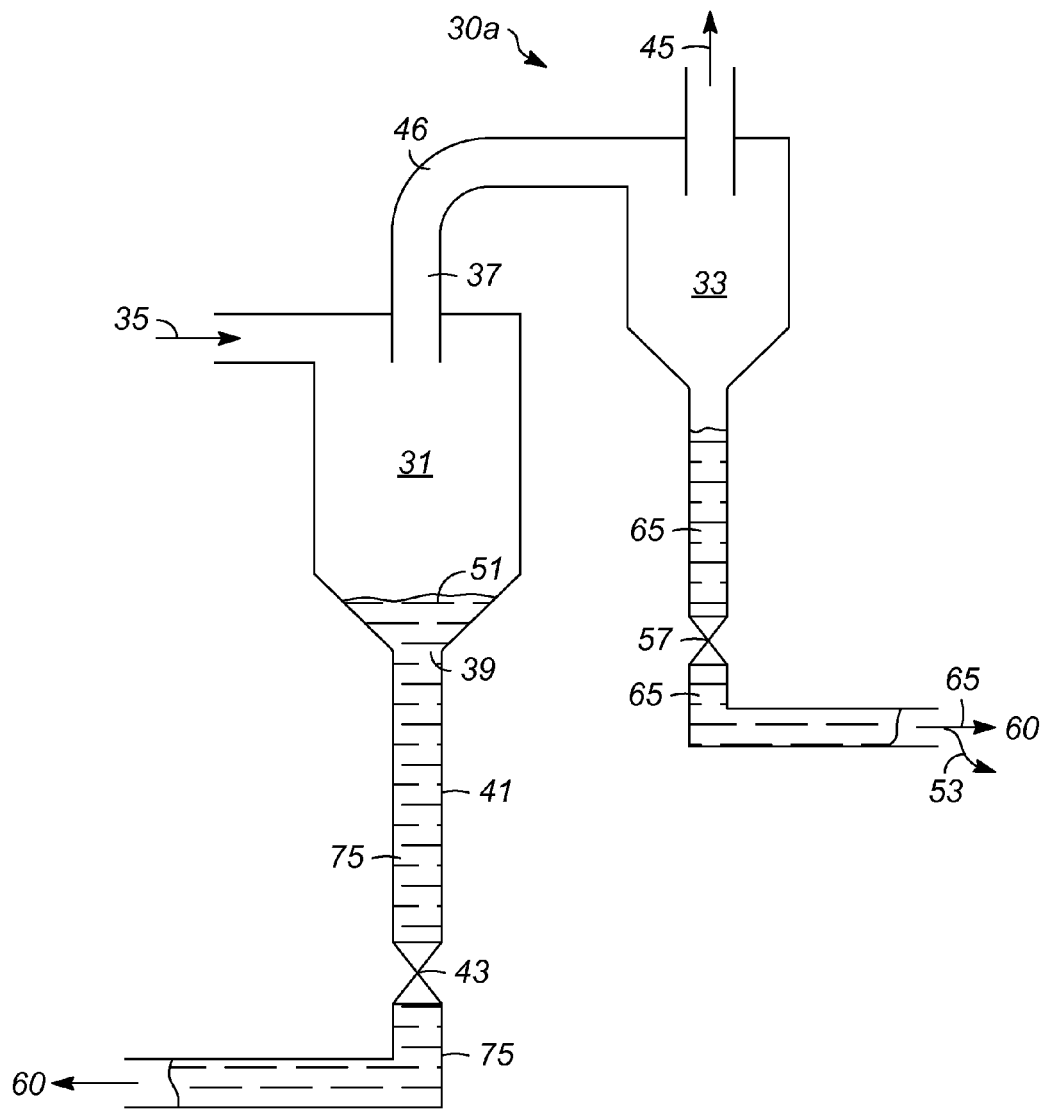

In one embodiment, as shown in FIGS. 2, 3A and 3B, the gas-solid separator 30a comprises a dual stage cyclone separator. The dual stage cyclone separator comprises a first stage cyclone separator 31 and a second stage cyclone separator 33. As shown in FIGS. 3A and 3B, the first stage cyclone separator 31 has a first outlet 37 coupled to an inlet of the second stage cyclone separator 33 and a second outlet 39 coupled to an inlet of the reheater 60. The char-depleted spent heat transfer medium 75 exits the first stage cyclone separator 31 and is directed to the reheater 60 via a pipe or dipleg 41. The level of solids in the pipe or dipleg 41 can be controlled by a first solids flow-control device 43 such as an L-valve, J-valve, slide valve or the like to control solids flow of the char-depleted spent heat transfer medium 75 (the inert solids, catalytic solids, or both) to the reheater 60 (FIGS. 3A and 3B).

In accordance with an exemplary embodiment, and as shown in FIGS. 2, 3A and 3B, the stream of gaseous pyrolysis products with entrained spent heat transfer medium 35 is transferred to the first stage cyclone separator of the gas-solid separator 30a. Preferably, the first stage cyclone separator collects the char-depleted spent heat transfer medium 75 and transfers a mixture 46 of pyrolysis gases with entrained char to the second stage cyclone separator 33. As shown in FIG. 3A, the first stage cyclone separator 31 generally runs substantially empty of solids with the gaseous pyrolysis gases being the continuous phase. The solids of the char-depleted spent heat transfer medium 75 do not become a continuous phase until exiting the first stage cyclone separator in the pipe or dipleg 41 because the cyclone gas vortex 24 in the first stage cyclone separator 31 would otherwise lift the solids of the char-depleted spent heat transfer medium out of the pipe or dipleg. A top surface 51 of the char-depleted spent heat transfer medium is shown in FIG. 3A in the dipleg 41 below the bottom of the first stage cyclone separator 31. A nitrogen purge (not shown) may be introduced at the top of the first stage cyclone separator to re-entrain the char from the first stage cyclone separator to the second stage cyclone separator, if necessary.

To improve char separation in a retrofitted dual stage cyclone separator, as shown in FIG. 3B, the first solids flow-control device 43 permits the solid particles of the char-depleted spent heat transfer medium 75 back into the bottom of the first stage cyclone separator (i.e., near or into the cyclone gas vortex 24 of the cyclone separator) so that the top surface 51 of the char-depleted spent heat transfer medium is at a higher level than that shown in 3A. By exposing the cyclone gas vortex to the char-depleted heat transfer medium, the cyclone gas vortex separates the lighter and/or smaller solid combustible particles (i.e., char) from the solid particles of the heat transfer medium in the first stage cyclone separator by lifting and carrying them out of the first stage cyclone separator 31 into the second stage cyclone separator 33 in the product vapor and fluidizing gas stream comprised of the pyrolysis gases with entrained char 46.

Still referring to FIGS. 2, 3A, and 3B, the second stage cyclone separator 33 collects pyrolysis gases with entrained char 46 from the first stage cyclone separator 31, resulting in separate streams of pyrolysis gases 45 and segregated char 65. The stream of pyrolysis gases 45 is transferred from the second stage cyclone separator 33 to a condenser 81 (FIG. 2). The condensable pyrolysis gases are condensed in the condenser into the liquid biomass-derived pyrolysis oil 49. The non-condensable pyrolysis gases 47 may be circulated to the reheater 60 for combustion and/or to the pyrolysis reactor 20 as lift medium for the heat transfer medium (as shown by arrow F in FIG. 2).

At least a portion of the segregated char 65 is transferred to the reheater 60 and processed as hereinafter described in accordance with FIGS. 6A-6E. In accordance with an exemplary embodiment, and as shown in FIGS. 2, 3A, and 3B, a portion of the segregated char may be exported (hereinafter "exported segregated char" 53) out of the pyrolysis system after exiting the gas-solid separator 30a and prior to the reheater 60 (step 300). Export of a portion of the segregated char prior to combustion helps maintain heat balance in the pyrolysis system and manage ash accumulation by removing a portion of the combustible solids before it would otherwise be combusted. The exported segregated char 53 may be further processed, used as end product (e.g., as fertilizer), sent for disposal, or a combination thereof. The exported segregated char may be removed before or after a second solids flow-control device 57 on the export stream (FIGS. 3A and 3B). Following is the calculation to determine the amount of exported segregated char 53 to be removed from the pyrolysis system in order to heat balance the pyrolysis system:

Char to be removed for heat balance (kg/hr)=$FY-\{GC_{p,FG}(T_{FG}-T_{air})+F(1-X_{H2O})H_{Rx}+F(C_{p,F}(T_{Rx}-T_F)+H_{vap})+Q_{losses}+AC_{p,A}(T_{sand}-T_{air})\}/H_{comb}$, wherein:
F=Wet biomass feed rate (kg/hr)
G=Flue gas rate (kg/hr)
$Q_{losses}$=Heat losses from pyrolysis system through walls to atmosphere (J/hr)
A=Air added for complete char combustion (kg/hr)
Y=Yield of char (kg char/kg wet biomass feed)
$X_{H2O}$=Mass fraction of water in wet biomass feed (kg water/kg wet biomass feed)
$C_{p,FG}$=Heat capacity of flue gas (J/kg/° C.)
$T_{FG}$=Temperature of flue gas leaving sand combustion bed (° C.)
$T_{air}$=Inlet temperature of air (° C.)
$T_F$=Inlet temperature of wet biomass feed (° C.)
$T_{sand}$=Temperature of sand bed in char combustion zone (° C.)
$T_{Rx}$=Temperature of pyrolysis reaction (° C.)
$C_{p,F}$=Sensible heat capacity of wet biomass feed (J/kg/° C.)
$C_{p,A}$=Heat capacity of air (J/kg/° C.)
$H_{Rx}$=Heat of reaction of pyrolytic conversion of biomass to pyrolysis products (J/kg dry biomass)
$H_{comb}$=Heat of combustion of char before or in sand combustion bed (J/kg char)
$H_{vap}$=Latent heat of vaporization of wet biomass (J/kg wet biomass)

Figure 4:
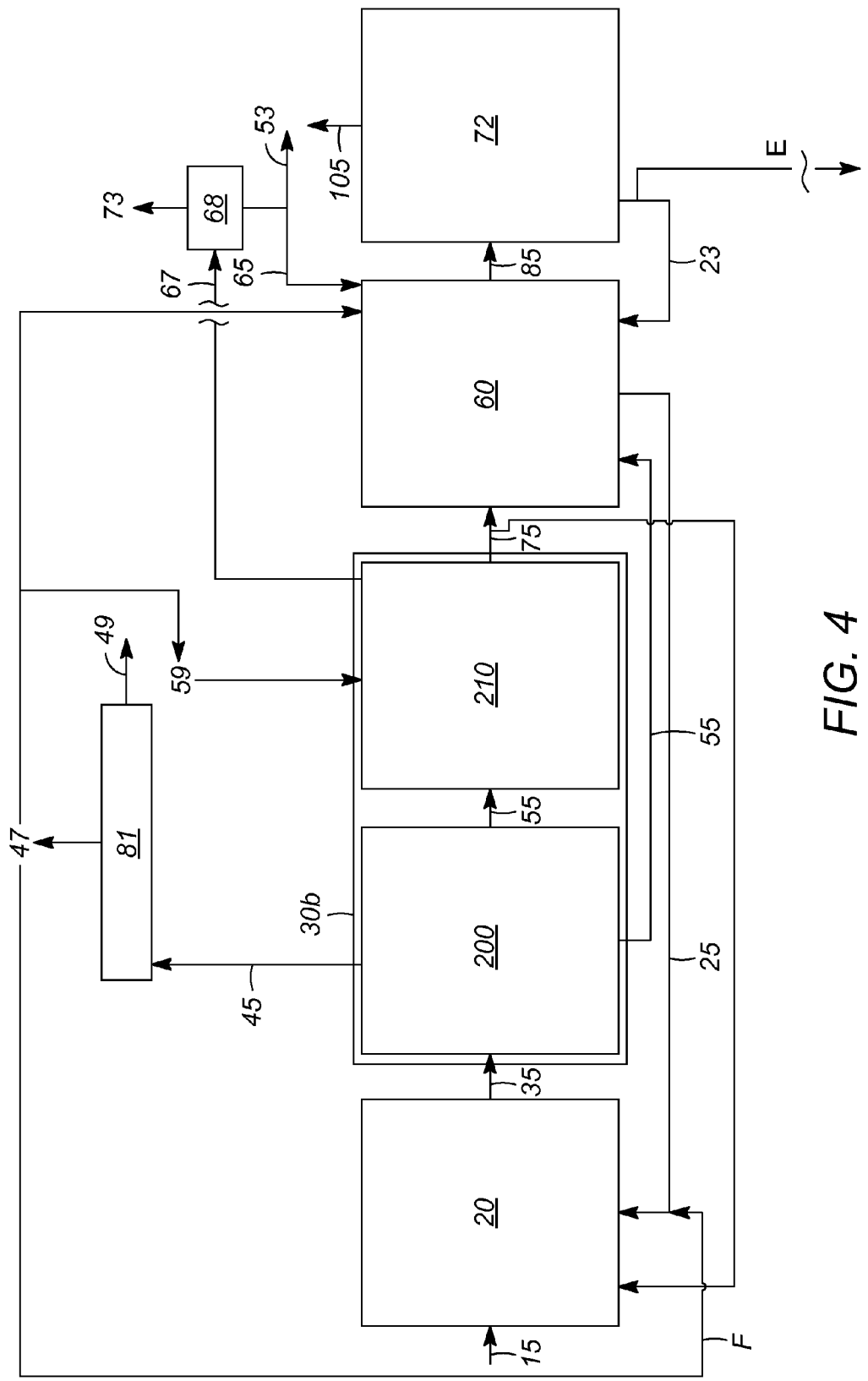
FIG. 4 is a diagram of another exemplary overall pyrolysis process apparatus including a cyclone separator coupled to an elutriation chamber in another gas-solid separator, in accordance with exemplary embodiments of the present invention.
Figure 5:
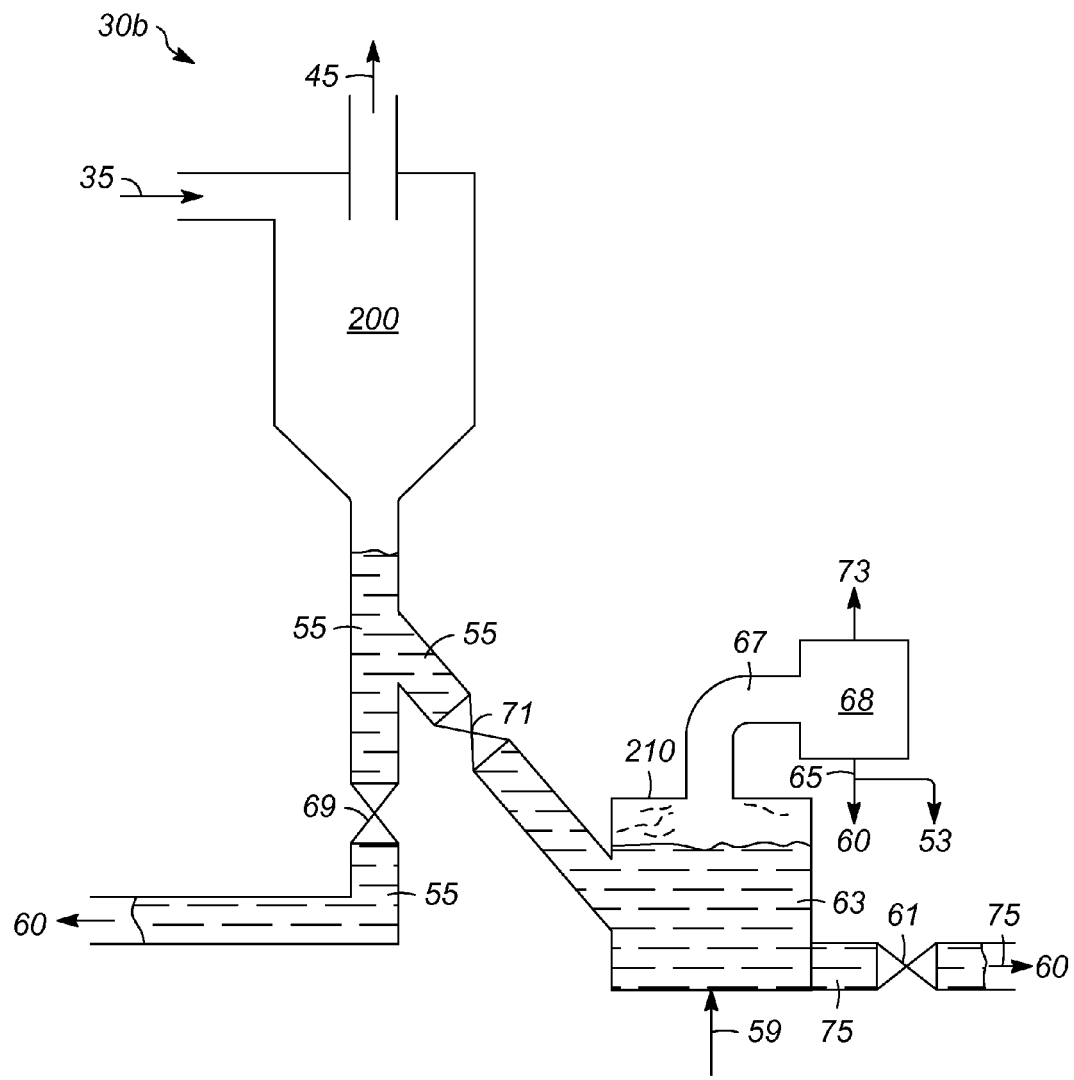
FIG. 5 is a schematic diagram of the mode of operation in the cyclone separator and elutriation chamber of FIG. 4, in accordance with another exemplary embodiment of the present invention.

In an alternative embodiment, as shown in FIGS. 4 and 5, the stream containing the gaseous pyrolysis products with entrained spent heat transfer medium 35 is transferred from the pyrolysis reactor 20 to a gas-solid separator 30b (FIG. 4). The gas-solid separator 30b comprises a cyclone separator 200 coupled to a char elutriation chamber 210. The gaseous pyrolysis products with entrained spent heat transfer medium 35 are transferred to the cyclone separator 200 for separation into separate streams of pyrolysis gases 45 and spent heat transfer medium 55. The pyrolysis gases 45 are transferred from the cyclone separator 200 of gas-solid separator 30b to the condenser 81 to condense the condensable gaseous pyrolysis products into liquid biomass-derived pyrolysis oil 49. The non-condensable gaseous pyrolysis gases 47 exit the condenser 81 and may be circulated to the reheater 60, as a source of fluidizing elutriation gas 59 for the char elutriation chamber 210, and/or to the pyrolysis reactor 20 as lift medium for the heat transfer medium (as shown by arrow F in FIG. 4). A first larger portion of the spent heat transfer medium 55 (with the gaseous pyrolysis products already removed) may be transferred to the reheater 60 and a second smaller portion thereof transferred to the char elutriation chamber 210. The flow to the reheater is controlled by a third solids flow control device 69 such as a slide valve (FIG. 5). The flow to the char elutriation chamber is controlled by a fourth solids flow control device 71. The second smaller portion of spent heat transfer medium 55 is introduced into a fluidized bed 63 of heat transfer medium maintained in the char elutriation chamber 210 for separation into a stream of char-depleted spent heat transfer medium 75 and a stream of segregated char and fluidizing elutriation gas (collectively referred to in FIGS. 4 and 5 with the reference numeral 67). The stream of char-depleted spent heat transfer medium 75 from the char elutriation chamber 210 is transferred to the reheater 60 through a fifth solids flow control device 61 or to the pyrolysis reactor 20.

The stream 67 of char and fluidizing elutriation gas is transferred to a solids-elutriation gas separator 68 such as a bag house, electrostatic precipitator, cyclone water deluge or the like for separation into segregated char 65 and fluidizing elutriation off-gas 73. As the combustible solid particles (i.e., the char) have a much lower density and/or smaller particle size than the solid particles of the heat transfer medium (i.e., inert solid particles, catalytic solid particles, or both), the char is readily elutriated by the fluidizing elutriation gas 59 from the non-condensable pyrolysis gases 47 or other convenient fluidizing gas. Elutriation is a known process for separating lighter particles from heavier particles using a vertically-directed stream of elutriation gas. The combustible particles rise to the top because their terminal velocities are lower than the velocity of the rising fluid.

At least a portion of the segregated char 65 is transferred to the reheater 60 and processed as hereinafter described in accordance with FIGS. 6A-6E. In accordance with an exemplary embodiment, and in the same manner as described above with respect to FIGS. 2, 3A, and 3B, and as shown in FIGS. 4 and 5, a portion of the segregated char may be exported out of the pyrolysis system after exiting the gas-solid separator 30b and prior to the reheater (FIG. 1, step 300). As noted previously, export of a portion of the segregated char prior to combustion helps maintain heat balance in the pyrolysis system and manage ash accumulation by removing a portion of the combustible solids before it would otherwise be combusted. The exported segregated char may be further processed, used as end product (e.g., as fertilizer), sent for disposal, or a combination thereof. The exported segregated char may be removed before or after a solids flow control device on the export stream. The amount of segregated char to be exported from the pyrolysis system in order to heat balance the pyrolysis system is calculated in the same manner as described above with respect to FIGS. 2, 3A and 3B. It is noted that, as the solids flow into the elutriation chamber of gas-solid separator 30b is relatively small compared to overall solids flow, the use of the gas-solid separator 30b is preferred when only a small fraction of the char is desired to be exported. While gas-solid separators 30a and 30b have been described, other types of gas-solid separators may be used to separate the pyrolysis gases from the spent heat transfer medium and at least a portion of the char from the spent heat transfer medium.

The char-depleted spent heat transfer medium 75 from gas-solid separator 30a and from gas-solid separator 30b are thereafter processed in the reheater 60 of FIGS. 2 and 4 as illustrated in FIGS. 6A-6E. The char-depleted spent heat transfer medium 75 from the first stage cyclone separator (of the gas-solid separator 30a in FIG. 2) and from the char elutriation chamber (of the gas-solid separator 30b in FIG. 4) is introduced into a fluidized dense bed 110 of the reheater 60 to combust at least a portion of any residual char using a stream of oxygen-containing regeneration gas 115, preferably air (step 80). An exemplary reheater 60 (shown in FIGS. 6A-6E) comprises a large vertical substantially cylindrical vessel 120 wherein the heat transfer medium is maintained as the fluidized dense bed 110 in the reheater by the upward passage of the oxygen-containing regeneration gas stream 115 (also referred to herein as a "primary oxidant stream"), preferably air, that fluidizes the heat transfer medium. The oxygen-containing regeneration gas stream also agitates the heat transfer medium within the fluidized dense bed. The oxygen-containing regeneration gas stream rises in an inlet riser 130 through the bottom of the reheater and into a reheater distributor 140a (FIG. 6A), 140b (FIGS. 6B and 6C), 140c (FIGS. 6D and 6E) into the reheater. The inlet riser 130 may include a first and a second inlet conduit 128 and 195 (FIGS. 6C and 6E) near a distal end thereof for purposes as hereinafter described. The fluidized dense bed 110 formed by the heat transfer medium is in a lower portion of the vessel and a dilute phase 150 is in an upper portion of the vessel. The reheater is typically maintained at a temperature of 400° C. to 1000° C.

Combustion product flue gas 85 (FIGS. 2 and 4) in the dilute phase, derived from the oxygen-containing regeneration gas stream, contains gases arising from the combustion of the combustible solids such as carbon dioxide, carbon monoxide from the oxygen-containing regeneration gas stream, inert gases such as nitrogen from air, and unreacted oxygen. The combustion product flue gas 85 also contains entrained combustible solids, inert solids, catalytic solids, or a combination thereof as well as at least a portion of the ash from combustion of the carbon from the combustible particles.

The portion of the ash that is not entrained in the combustion product flue gas remains in the fluidized dense bed of heat transfer medium. Depending on the ash yield and ash entrained in the combustion product flue gas, the amount of ash in the regenerated heat transfer medium may vary. In accordance with an exemplary embodiment, ash accumulation in the reheater is controlled by removing the "exported segregated char" from the pyrolysis system prior to combustion (to produce less ash) or combusting the segregated char in the fluidized dense bed of the reheater that results in more of the ash exiting the reheater in the combustion product flue gas, as hereinafter described.

The char-depleted spent heat transfer medium 75 from the gas-solid separator 30a or 30b is introduced into a lower portion of the fluidized dense bed to permit the residual char, if present, contained in the stream of char-depleted spent heat transfer medium to be combusted in the fluidized dense bed, as indicated by arrow A in FIGS. 6A-6E to designate the flow direction of the char-depleted spent heat transfer medium. Flow may be controlled by a first valve 175. As used herein, "a lower portion" of the fluidized dense bed means that portion closer to a bottom surface of the fluidized dense bed than a top surface of the fluidized dense bed. The char-depleted spent heat transfer medium enters the oxygen-containing regeneration gas stream in the reheater under conditions sufficient to combust the residual char converting the "char-depleted spent heat transfer medium" into "heat transfer medium". Heat from the combustion is transferred to the heat transfer medium in the fluidized dense bed. Combustion raises the temperature of the dense bed material (i.e., the heat transfer medium) to the operating conditions needed in the pyrolysis reactor, i.e., 300° C. to 900° C.

The segregated char 65 from gas-solid separator 30a and the segregated char 65 derived from gas-solid separator 30b are thereafter processed in the same manner. Still referring to FIGS. 1, 2, 4, and 6A-6E, at least a portion of the segregated char 65 from the second stage cyclone separator (gas-solid separator 30a (FIG. 2)) and from the solids-elutriation gas separator 68 (FIG. 4) is introduced into the fluidized dense bed of the reheater to combust at least a portion of the segregated char using the oxygen-containing regeneration gas and increase the temperature of the inert solids, the catalytic solids, or both, in the fluidized dense bed (step 90), as indicated by arrow B in FIGS. 6A-6E to designate the flow direction of the segregated char. Flow of the segregated char into the fluidized dense bed may be controlled by a second valve 180. Segregation of the char stream from the char-depleted spent heat transfer medium permits its deeper introduction into the fluidized dense bed thus minimizing the potential for afterburn in the dilute phase.

Figure 6A:
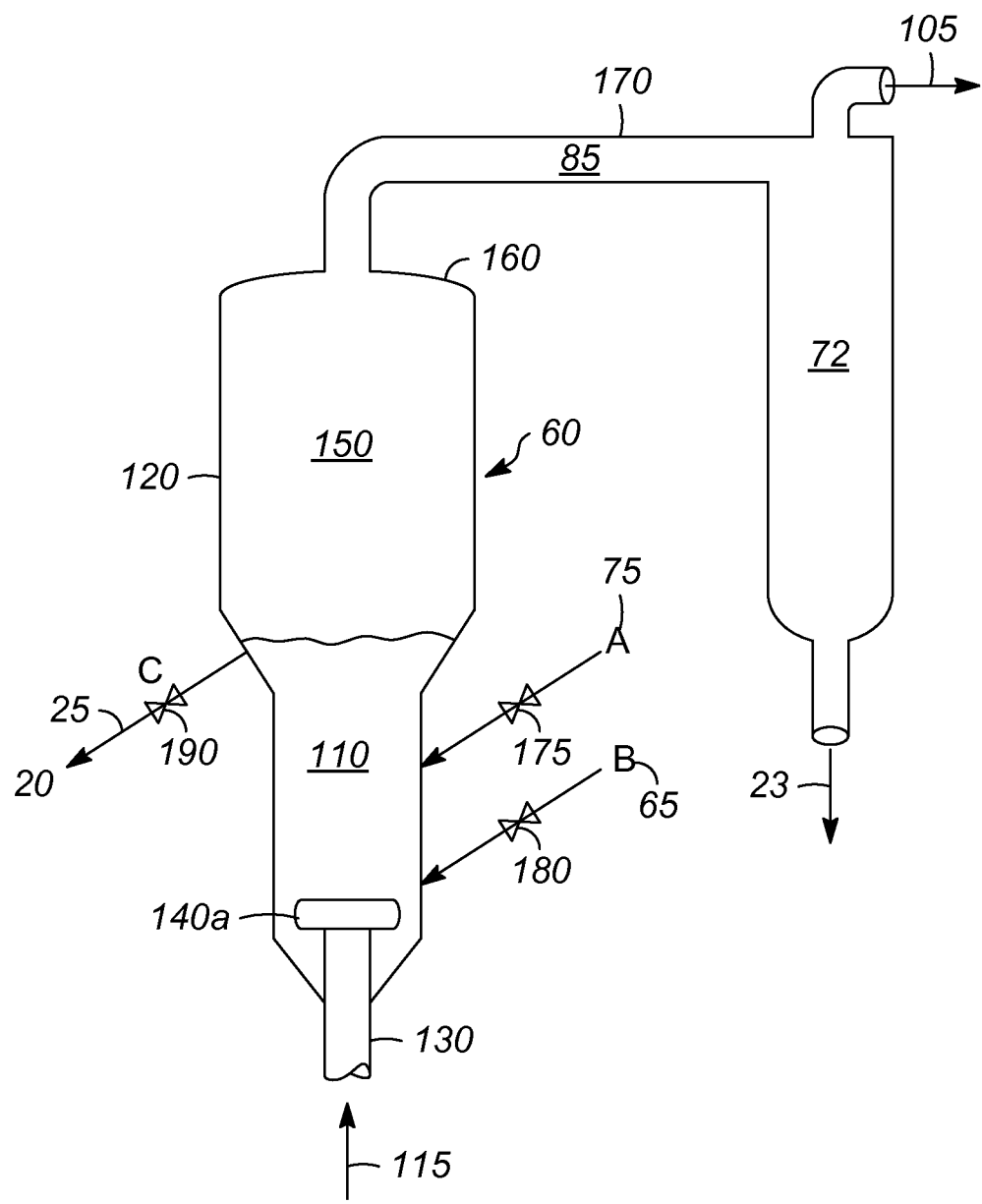
FIGS. 6A-6E are schematic diagrams of various exemplary embodiments of the reheater of the present invention.

In one embodiment, as shown in FIG. 6A, the segregated char may be introduced directly into the fluidized dense bed to mix with the inert solids, catalytic solids, or both in the fluidized dense bed, where the segregated char 65 is then combusted by the oxygen-containing regeneration gas stream 115, which increases the temperature of the heat transfer medium to pyrolysis temperature, as noted previously. The segregated char is introduced at an elevation below where the char-depleted spent heat transfer medium is introduced, permitting more efficient combustion and additional combustion time. The oxygen-containing regeneration gas stream 115 rises in the inlet riser 130 through the bottom of the reheater and into the reheater distributor 140a in the bottom portion of the reheater. The reheater distributor includes an opening (not shown in FIG. 6A) through which the oxygen-containing regeneration gas stream 115 is discharged into the reheater.

Figure 6B:
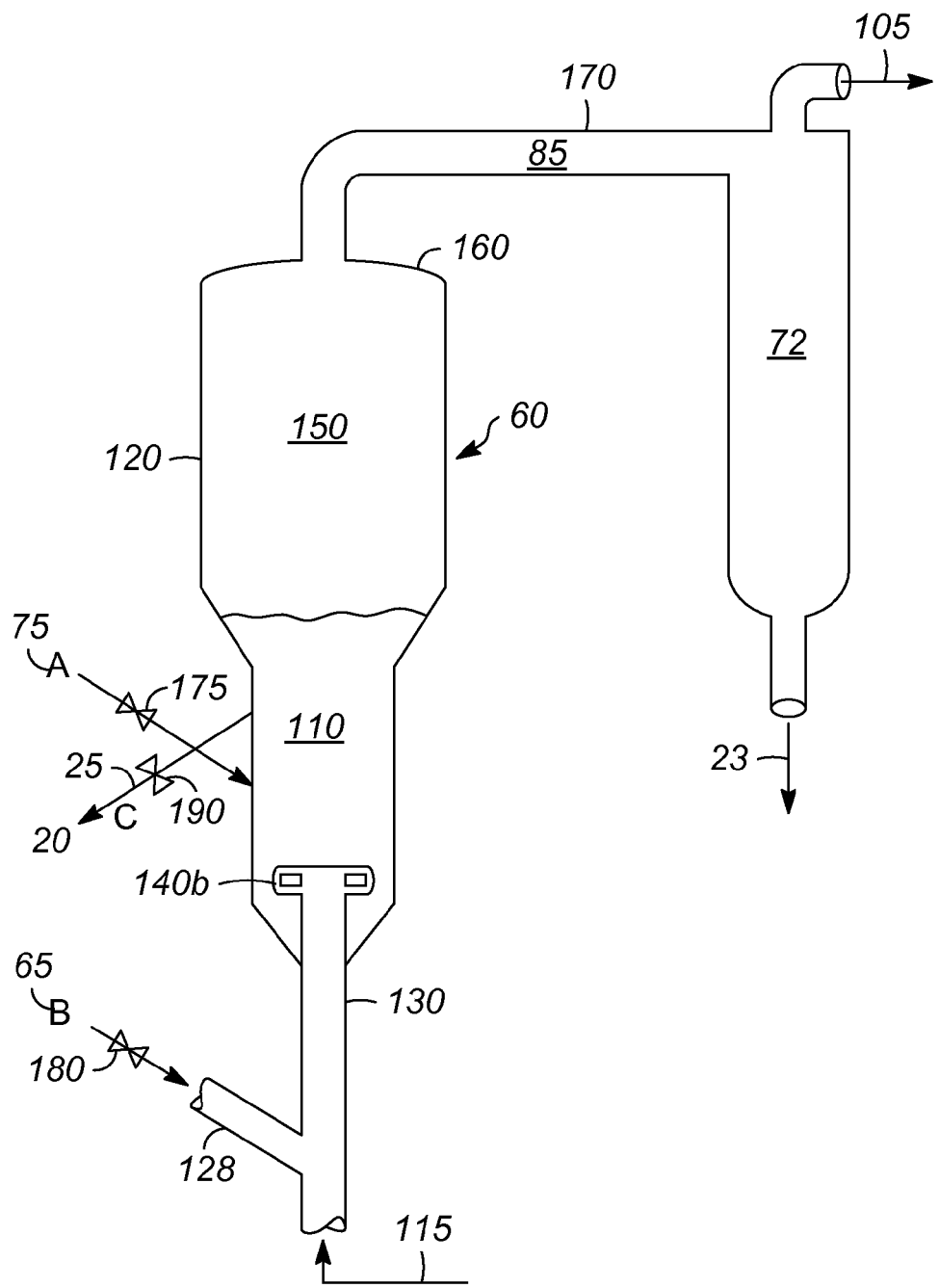
Figure 6C:
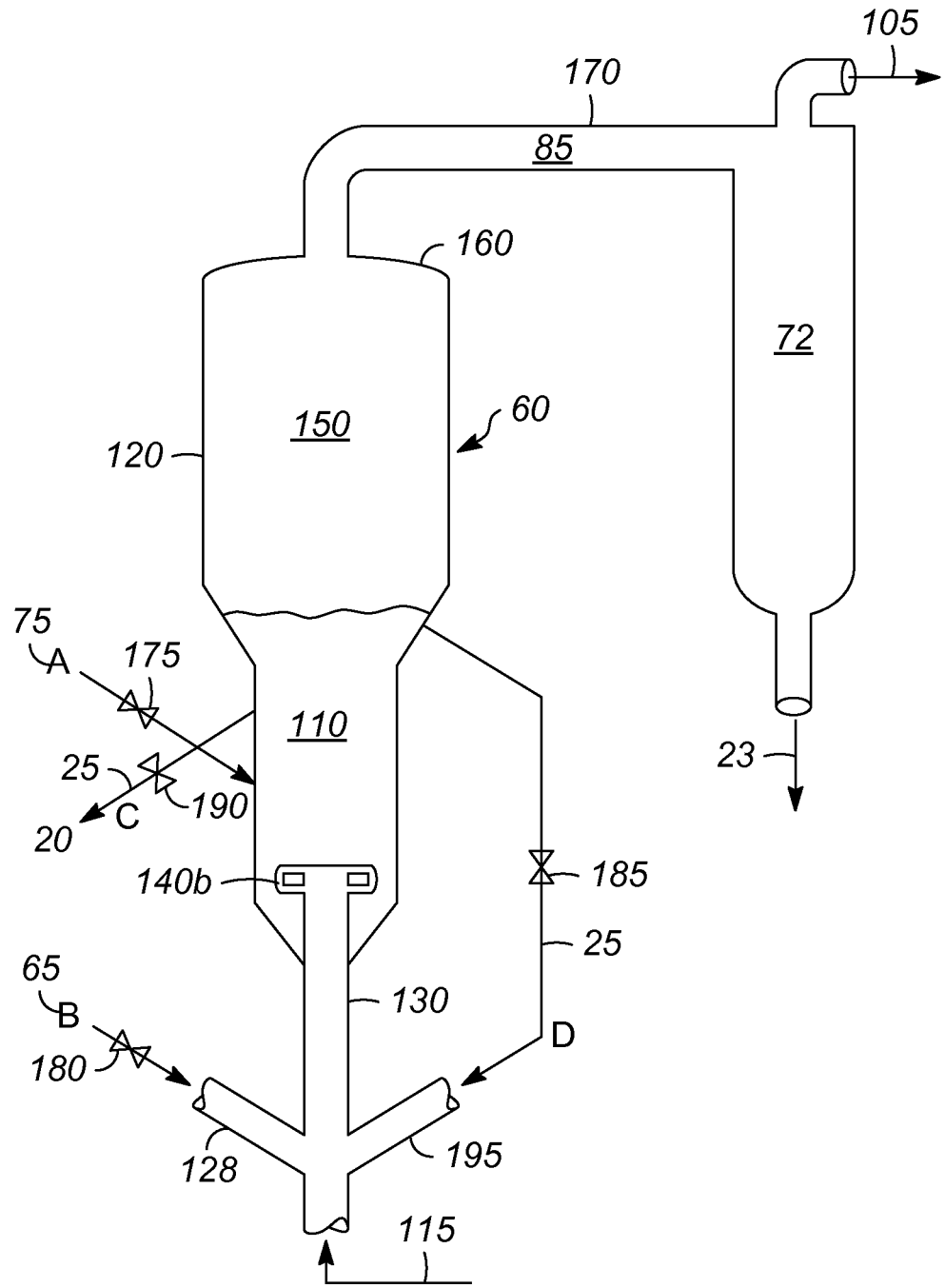
Figure 6D:
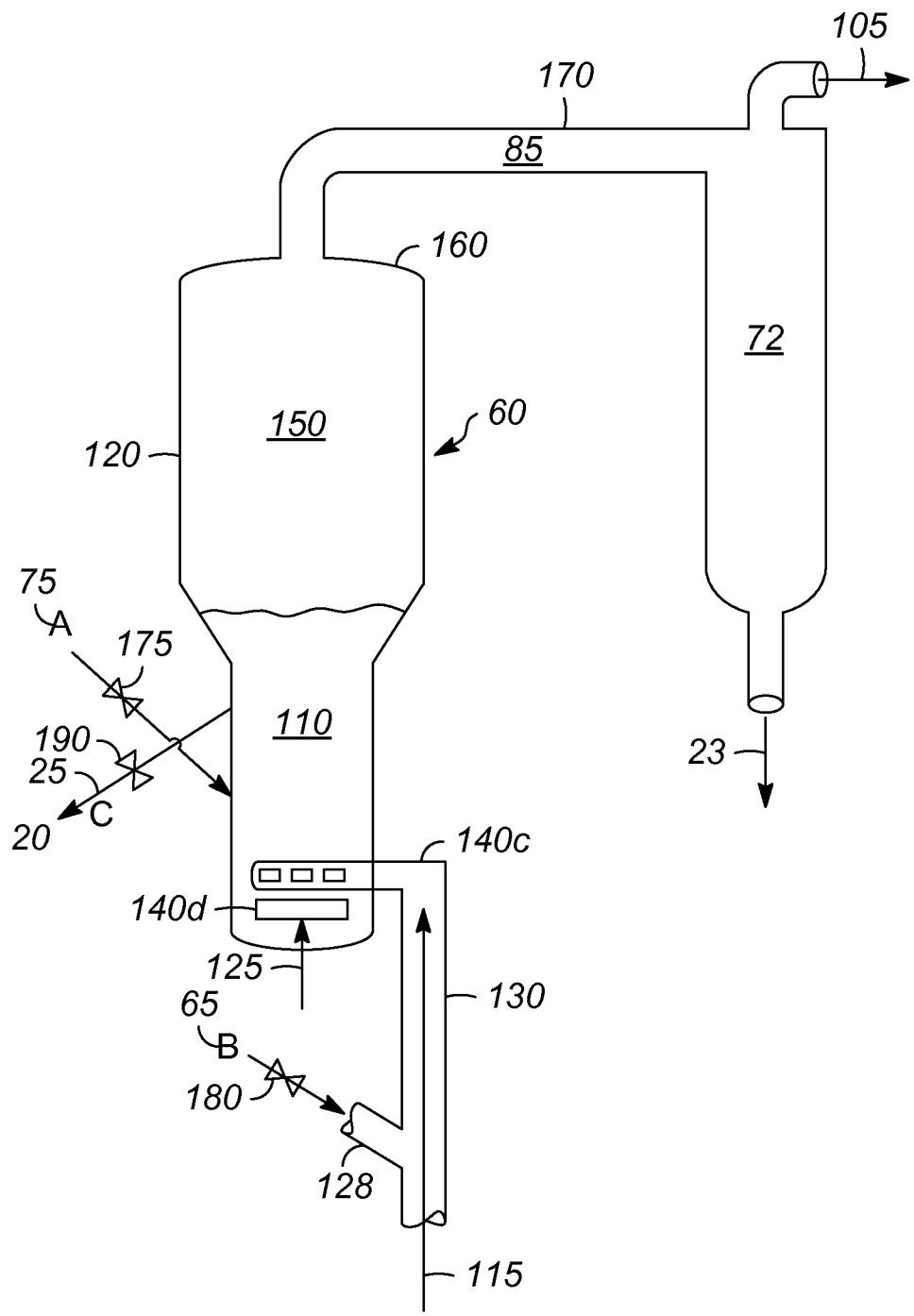
Figure 6E:
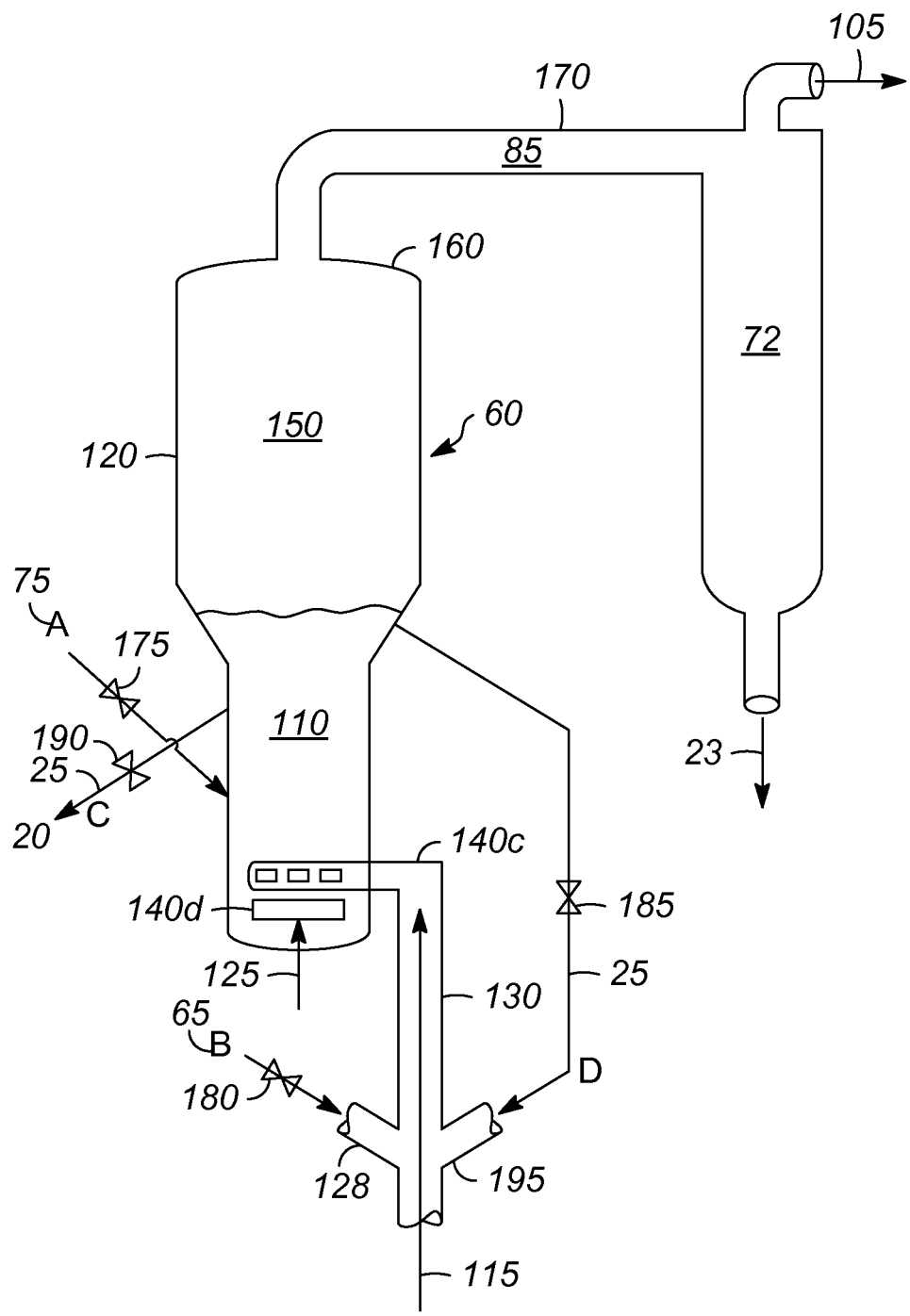

In alternative embodiments as shown in FIGS. 6B-6E, the segregated char 65 may be combusted in the dense bed and additionally combusted (step 100) (FIG. 1) outside of the reheater in the inlet riser 130 through which the stream of oxygen-containing regeneration gas 115 is introduced upwardly into the dense bed. In the additional combustion step, the segregated char 65 is introduced into the oxygen-containing regeneration gas stream through the first inlet conduit 128 near a distal end of the inlet riser 130 and into the reheater 60 through a reheater distributor 140b or 140c, as hereinafter described. The segregated char is initially combusted in the inlet riser and then the non-combusted segregated char is combusted in the dense bed. As shown in FIGS. 6C and 6E, the segregated char 65 may be mixed with an effective amount (equal to the flow rate of A or C of the heated inert solids, catalytic solids, or both (i.e., the heat transfer medium), as indicated by arrow D from the reheater dense bed which increases the rate of additional combustion of the segregated char. The heated inert solids, heated catalytic solids, or both may be introduced into the inlet riser through the second inlet conduit 195 to mix with the segregated char (FIGS. 6C and 6E). The flow of the heated inert solids, heated catalytic solids, or both from the reheater may be controlled by a third valve 185. The segregated char is at least partially combusted outside of the reheater while it flows upwardly in the inlet riser, with or without the heated heat transfer medium, in the oxygen-containing regeneration gas, and further combusted in the fluidized dense bed, thereby minimizing its combustion, i.e., "afterburn" in the dilute phase or downstream therefrom, such as in a plenum 160 or a flue gas transfer line 170. The reheater distributor 140b (FIGS. 6B and 6C) may include at least one opening through which the oxygen-containing regeneration gas and the segregated char, or the oxygen-containing regeneration gas and the mixture of segregated char and heated heat transfer medium may be discharged into the lower portion of the dense bed. The oxygen provided by the oxygen-containing regeneration gas stream 115 comprises substantially the stoichiometric amount of oxygen needed for substantially complete combustion of the char (both residual and segregated char) (FIGS. 6A, 6B, and 6C). Alternatively, more than the stoichiometric amount of oxygen may be added, in an amount of 10 to 15% more than the stoichiometric amount.

In other embodiments, as shown for example in FIGS. 6D and 6E, less than the stoichiometric amount of oxygen is provided by the oxygen-containing regeneration gas stream (hereinafter referred to as a "primary oxidant stream") and a secondary oxidant stream 125 also enters the reheater. The secondary oxidant stream preferably comprises air. The secondary oxidant stream provides from 25 to 75% of the overall oxygen gas needed for substantially complete combustion of the char (both residual and segregated char) in the reheater. The primary oxidant stream is introduced into the reheater through reheater distributor 140c. In one exemplary embodiment, the reheater distributor 140c comprises a substantially L-shaped distributor and includes openings through which the primary oxidant stream is introduced into the reheater along with at least partially combusted segregated char or a mixture of at least partially combusted char and heated heat transfer medium. The secondary oxidant stream enters the reheater through a reheater distributor 140d at a level below the reheater distributor 140c.

Combustion of the combustible solids from the spent heat transfer medium regenerates the heat transfer medium. The regenerated heat transfer medium 25 is withdrawn from an upper portion of the fluidized dense bed and returned to the pyrolysis reactor 20, as indicated by arrow C in FIGS. 6A-6E, for further usage as the heat transfer medium, as shown in FIGS. 2 and 4. Flow of the regenerated heat transfer medium 25 from the reheater may be controlled by a fourth valve 190.

Referring again to FIGS. 2 and 4 and 6A-6E, the combustion product flue gas 85 passes from the reheater 60 via gas discharge conduit (not shown) into the plenum 160, located in the upper portion of the reheater. Combustion product flue gas 85 is vented or otherwise removed from the reheater via the flue gas transfer line 170 from the plenum into an external flue gas-solids separator 72 such as a cyclone separator. At least a portion of the solid particles entrained in the combustion product flue gas 85, such as a mixture 23 of heat transfer medium and ash, are separated from the combustion product flue gas 85 in the external flue gas-solid separator 72 forming substantially solids-free flue gas 105. The substantially solids-free flue gas may contain residual combustible solid particles and residual ash particles as these particles are generally smaller (on average) than the inert solid particles and the catalytic solid particles and therefore not as easily separated from the flue gas in the external flue gas-solids separator 72. That the substantially solids-free flue gas may contain residual ash particles enables the ash particles to escape the reheater confines, thus substantially preventing ash build-up in the reheater.

As shown in FIGS. 2 and 4, the mixture 23 of separated heat transfer medium and ash from the flue gas-solid separator may be recirculated to the reheater for regeneration of the separated heat transfer medium. Alternatively, the mixture 23 of separated heat transfer medium and ash may be removed from the pyrolysis system as indicated by arrow E in FIGS. 2 and 4. As a matter of economics, a heat transfer medium comprising catalytic solids may be recirculated to the reheater while typically less costly sand is removed from the pyrolysis system for disposal. Ash may be also separated from the mixture 23 by known methods and removed from the pyrolysis system (not shown).

From the foregoing, it is to be appreciated that the exemplary embodiments of the char-handling processes for char segregation and selective removal from the pyrolysis system have been provided. Such char-handling processes help control the overall heat balance, ash accumulation, and afterburn in the reheater during regeneration of the heat transfer medium. The char-handling processes contribute to combustion of the combustible solids and the carbon monoxide below the dilute phase such as in the fluidized dense bed or in an inlet riser into the reheater, thus minimizing combustion in the dilute phase, or downstream therefrom (i.e., "afterburning") which also results in more ash leaving with the combustion product flue gas. Therefore, the amount of heat transferred to the reheater dense bed is increased for regeneration of the heat transfer medium and ash accumulation is minimized. In addition, such char-handling processes permit the selective removal of a portion of the energy rich char stream from the pyrolysis system to provide a balance between the heat supplied from char combustion in the reheater with the heat demand due to sensible and latent heat required from the cold feedstock, ambient heat losses, and the pyrolysis reaction.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A method, comprising:
   i) separating a mixed stream comprising heat transfer medium and char into a segregated char stream and a char-depleted stream;
   ii) introducing the char-depleted stream to a dense bed of heat transfer medium fluidized by an oxygen-containing fluidization gas, said oxygen-containing fluidization gas introduced into a lower portion of the fluidized dense bed; and
   iii) combusting the segregated char stream to heat the lower portion of the fluidized dense bed,
   wherein at least a portion of the segregated char stream is mixed with the oxygen-containing fluidization gas and at least partially combusted in said gas prior to introduction to the fluidized dense bed.

2. The method of claim 1, wherein at least a further portion of the segregated char stream is introduced directly into the lower portion of the fluidized dense bed.

3. The method of claim 1, wherein the oxygen-containing fluidization gas comprises an amount of oxygen needed for combustion of the char.

4. The method of claim 1, wherein the oxygen-containing fluidization gas comprises an amount of oxygen in a range of 10% to 15% more oxygen than a stoichiometric amount of oxygen needed for combustion of the char.

5. The method of claim 1, wherein the fluidized dense bed is contained in a reheater.

6. The method of claim 5, wherein the potential for afterburn in the reheater is minimized.

7. The method of claim 5, wherein the oxygen-containing fluidization gas comprises a primary oxidant stream and a secondary oxidant stream.

8. The method of claim 7, wherein the secondary oxidant stream comprises air.

9. The method of claim 7, wherein the secondary oxidant stream comprises an amount of oxygen in a range of between 25% and 75% of an amount of oxygen needed for combustion of the char.

10. The method of claim 1, wherein the oxygen-containing fluidization gas comprise air.

11. A process to heat a heat transfer medium in a reheater, comprising:
   i) separating a mixed stream comprising the heat transfer medium and char into a plurality of separate streams comprising:
      a) a first stream rich in the heat transfer medium and containing a residual quantity of char; and
      b) a second stream comprising char;
   ii) introducing the first stream into a dense bed in a lower portion of the reheater;
   iii) fluidizing said dense bed with at least a primary oxygen-containing regeneration gas stream; and
   iv) combusting all or a portion of the char with the primary oxygen-containing regeneration gas stream,
   wherein:
      X) the primary oxygen-containing regeneration gas stream is introduced to the dense bed through an inlet riser in fluid communication with a lower portion of the reheater; and
      Y) the second stream is mixed and at least partially combusted with the primary oxygen-containing regeneration gas stream in the inlet riser.

12. The process of claim 11, wherein the mixed stream is received from a pyrolysis reactor and the heated heat transfer medium is returned from the reheater to the pyrolysis reactor.

13. The process of claim 11, wherein the process further comprises:
   removing a portion of the heated heat transfer medium from the fluidized dense bed and mixing said removed portion with the second stream in the inlet riser.

14. The process of claim 11, wherein:
   A) the plurality of separate streams further comprises: an additional stream comprising char; and
   B) the process further comprises: combusting the additional stream in a lower portion of the dense bed.

15. The process of claim 11, wherein the at least a primary oxygen-containing regeneration gas stream comprises a secondary oxidant stream introduced through a reheater distributor in the lower portion of the dense bed.

16. The process of claim 11, wherein:
   A) the plurality of separate streams additionally comprises: a further stream comprising char; and
   B) the process additionally comprises: exporting the further stream.

17. A method, comprising:
   i) separating a mixed stream comprising heat transfer medium and char into a segregated char stream and a char-depleted stream;
   ii) introducing the char-depleted stream to a dense bed of heat transfer medium fluidized by an oxygen-containing fluidization gas, said oxygen-containing fluidization gas introduced into a lower portion of the fluidized dense bed; and
   iii) combusting the segregated char stream to heat the lower portion of the fluidized dense bed,
   wherein:
      a) the fluidized dense bed is contained in a reheater;
      b) the oxygen-containing fluidization gas comprises a primary oxidant stream and a secondary oxidant stream; and
      c) at least a portion of the segregated char stream is mixed with the primary oxidant stream and at least partially combusted in said primary oxidant stream prior to introduction to the fluidized dense bed.

* * * * *